(12) United States Patent
Shiratori et al.

(10) Patent No.: US 9,233,357 B2
(45) Date of Patent: Jan. 12, 2016

(54) EXHAUST GAS PURIFYING CATALYST AND METHOD FOR PRODUCING SAME

(75) Inventors: Kazuyuki Shiratori, Yokohama (JP); Yoshiaki Hiramoto, Yokosuka (JP); Haruhiko Shibayama, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/345,761

(22) PCT Filed: Aug. 2, 2012

(86) PCT No.: PCT/JP2012/069662
§ 371 (c)(1),
(2), (4) Date: Mar. 19, 2014

(87) PCT Pub. No.: WO2013/042461
PCT Pub. Date: Mar. 28, 2013

(65) Prior Publication Data
US 2014/0250872 A1  Sep. 11, 2014

(30) Foreign Application Priority Data
Sep. 20, 2011  (JP) .................................. 2011-204416

(51) Int. Cl.
*F01N 3/00* (2006.01)
*F01N 3/02* (2006.01)
*F01N 3/10* (2006.01)
*F01N 3/20* (2006.01)
*B01J 23/63* (2006.01)
(Continued)

(52) U.S. Cl.
CPC ............... *B01J 23/63* (2013.01); *B01D 53/945* (2013.01); *B01J 23/58* (2013.01); *B01J 35/04* (2013.01); *F01N 3/10* (2013.01); *F01N 3/2828* (2013.01); *B01D 2255/1023* (2013.01); *B01D 2255/1025* (2013.01); *B01D 2255/202* (2013.01); *B01D 2255/204* (2013.01); *B01D 2255/908* (2013.01); *B01D 2255/9022* (2013.01); *B01D 2257/404* (2013.01); *B01D 2257/502* (2013.01); *B01D 2257/702* (2013.01); *Y02T 10/22* (2013.01)

(58) Field of Classification Search
USPC .......... 60/299; 428/117; 427/372.2; 502/240, 502/300, 302–304
See application file for complete search history.

(56) References Cited

U.S. PATENT DOCUMENTS

2003/0125202 A1  7/2003  Ruwisch et al.
2008/0139382 A1  6/2008  Morisaka et al.
(Continued)

FOREIGN PATENT DOCUMENTS

CA  2280631 A1  2/2000
EP  0982066 A1  3/2000
(Continued)

*Primary Examiner* — Audrey K Bradley
*Assistant Examiner* — Dapinder Singh
(74) *Attorney, Agent, or Firm* — Young Basile

(57) ABSTRACT

An exhaust gas purifying catalyst comprises: a plurality of catalyst units which contain anchor particles that support noble metal particles; and an enclosure material that internally contains the plurality of catalyst units and separates the catalyst units from each other. Both the anchor particles and the enclosure material contain an alkali element and/or an alkaline earth element. Due to this configuration, this exhaust gas purifying catalyst is capable of maintaining the exhaust gas purification performance by suppressing agglomeration of the noble metal particles even in cases where the ambient temperature is high.

11 Claims, 8 Drawing Sheets

(51) Int. Cl.
  *B01J 23/58* (2006.01)
  *B01D 53/94* (2006.01)
  *F01N 3/28* (2006.01)
  *B01J 35/04* (2006.01)

(56) References Cited

U.S. PATENT DOCUMENTS

| | | |
|---|---|---|
| 2008/0167181 A1 | 7/2008 | Nakamura et al. |
| 2008/0187714 A1 | 8/2008 | Wakamatsu et al. |
| 2012/0053050 A1* | 3/2012 | Shiratori et al. ............ 502/240 |
| 2012/0131911 A1 | 5/2012 | Nakagawa et al. |

FOREIGN PATENT DOCUMENTS

| | | | |
|---|---|---|---|
| EP | 2502672 | * | 5/2011 |
| EP | 2404668 | A1 | 1/2012 |
| JP | 2007313500 | A | 12/2007 |
| JP | 2008093496 | A | 4/2008 |
| JP | 2008168192 | A | 7/2008 |
| JP | 2008284534 | A | 11/2008 |
| JP | 2010005592 | A | 1/2010 |
| WO | 2010101223 | A1 | 9/2010 |
| WO | 2011062129 | A1 | 5/2011 |

* cited by examiner

EXHAUST GAS PURIFYING CATALYST AND METHOD FOR PRODUCING SAME

CROSS REFERENCE TO RELATED APPLICATION

The present application claims priority to Japanese Patent Application No. 2011-204416, filed Sep. 20, 2011, incorporated herein in its entirety.

TECHNICAL FIELD

The present invention relates to an exhaust gas purifying catalyst to purify exhaust gas emitted from an internal combustion engine, and a method for manufacturing the same. More specifically, the present invention relates to an exhaust gas purifying catalyst having high heat resistance and capable of purifying harmful substances contained in exhaust gas with high efficiency, and a method for manufacturing the same.

BACKGROUND

There are known three-way catalysts as exhaust gas purifying catalysts installed in vehicles and the like to oxidize or reduce harmful gas (hydrocarbon (HC), carbon monoxide (CO), nitrogen oxide (NOx)) contained in exhaust gas. In association with the recent increase in consciousness of environmental issues, regulations on exhaust gas emitted from vehicles and the like are being tightened. In response to such regulations, advances are being made in the improvement of three-way catalysts.

For example, there is disclosed a three-way catalyst as an exhaust gas purifying catalyst in which particles containing noble metal particles supported on a metal oxide are covered with a porous oxide (for example, refer to Japanese Patent Unexamined Publication No. 2008-284534). In this exhaust gas purifying catalyst, the metal oxide contains a rare earth element, alkali metal and alkaline-earth metal. Therefore, since the noble metal particles are prevented from moving from the metal oxide and being aggregated even under high temperature conditions, particle diameters of approximately several nanometers can be maintained.

SUMMARY

In actual fact, when the exhaust gas purifying catalyst disclosed in Patent Literature 1 is supported on a honeycomb substrate used as an underfloor catalyst operated relatively at low temperature or used as a manifold catalyst having a long exhaust manifold, the aggregation of the noble metal particles can be effectively prevented. In recent years, however, manifold catalysts having short exhaust manifolds are being used with increasing frequency in view of the tightened regulations on exhaust gas and rapid activation. The manifold catalysts are generally used in higher temperature environment, which may exceed 900° C. As a result, the aggregation of the noble metal particles tends to be difficult to prevent even when the exhaust gas purifying catalyst disclosed in Japanese Patent Unexamined Publication No. 2008-284534 is used.

The present invention has been made in view of the conventional problem described above. It is an object of the present invention to provide an exhaust gas purifying catalyst capable of preventing aggregation of noble metal particles even used in higher temperature environment so as to keep exhaust gas purification performance, and to provide a method for manufacturing the same.

An exhaust gas purifying catalyst according to a first aspect of the present invention includes: plural catalyst units containing noble metal particles and anchor particles serving as an anchor material of the noble metal particles and supporting the noble metal particles thereon; and an enclosure material enclosing the plural catalyst units and separating the catalyst units from one another. The anchor particles and the enclosure material both contain at least one of an alkali element and an alkaline-earth element.

An exhaust gas purifying catalyst according to a second aspect of the present invention includes: catalyst particles containing: catalyst units containing noble metal particles and anchor particles serving as an anchor material of the noble metal particles and supporting the noble metal particles thereon; promoter units containing first promoter particles not in contact with the noble metal particles and having an oxygen storage and release capacity; and an enclosure material enclosing both the catalyst units and the promoter units and separating the noble metal particles and the anchor particles in the catalyst units from the first promoter particles in the promoter units. The anchor particles and the enclosure material both contain at least one of an alkali element and an alkaline-earth element.

A method for manufacturing an exhaust gas purifying catalyst according to a third aspect of the present invention includes pulverizing composite particles of the noble metal particles and the anchor particles. The method further includes mixing the pulverized composite particles into slurry containing a precursor of the enclosure material and a precursor of at least one of the alkali element and the alkaline-earth element and drying the slurry.

BRIEF DESCRIPTION OF DRAWINGS

The description herein makes reference to the accompanying drawings wherein like reference numerals refer to like parts throughout the several views, and wherein:

FIG. 1A is a perspective view showing an exhaust gas purifying catalyst structure. FIG. 1B is a partially enlarged schematic view of the part indicated by reference symbol B in FIG. 1A. FIG. 1C is a partially enlarged schematic view of the part indicated by reference symbol C in FIG. 1B.

FIG. 2A and FIG. 2B are schematic views for explaining an aggregation state of noble metal particles in a conventional exhaust gas purifying catalyst. FIG. 2C and FIG. 2D are schematic views for explaining an aggregation state of noble metal particles in the exhaust gas purifying catalyst according to the present embodiment.

FIG. 10A is a cross-sectional view showing a cell of an exhaust gas purifying catalyst structure. FIG. 10B is a partially enlarged schematic view of the part indicated by reference symbol B in FIG. 10A. FIG. 10C is a partially enlarged schematic view of the part indicated by reference symbol C in FIG. 10B.

DESCRIPTION OF EMBODIMENTS

Figure 1A:
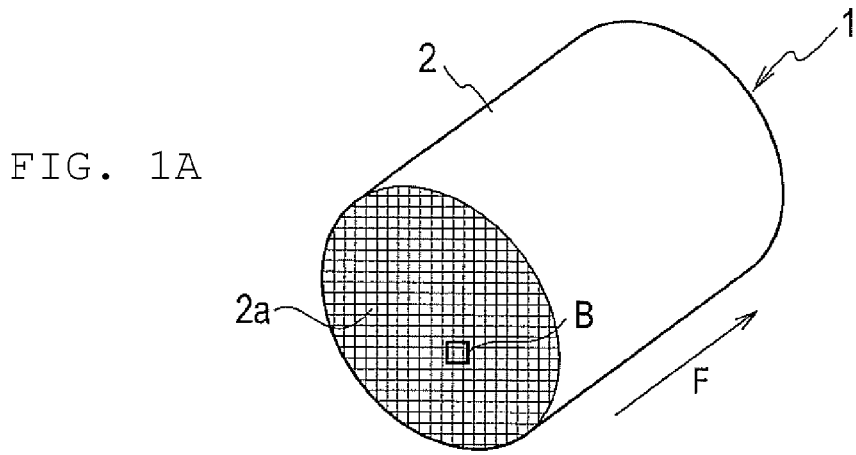
FIGS. 1A-1C are schematic views showing an exhaust gas purifying catalyst and an exhaust gas purifying catalyst structure according to a first embodiment of the present invention.

Hereinafter, embodiments of the present invention will be explained with reference to the drawings. It should be noted that dimensional ratios in the drawings are magnified for convenience of explanation and may be different from actual ratios.

Exhaust Gas Purifying Catalyst and Exhaust Gas Purifying Catalyst Structure

First Embodiment

Figure 1B:
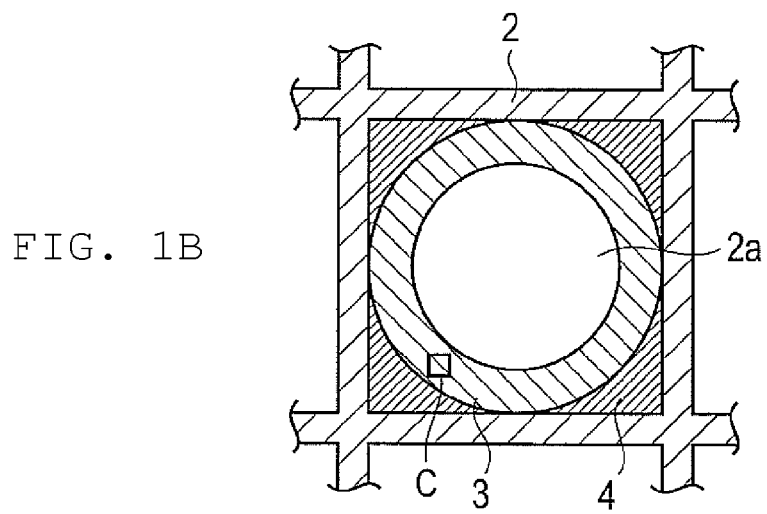
Figure 1C:
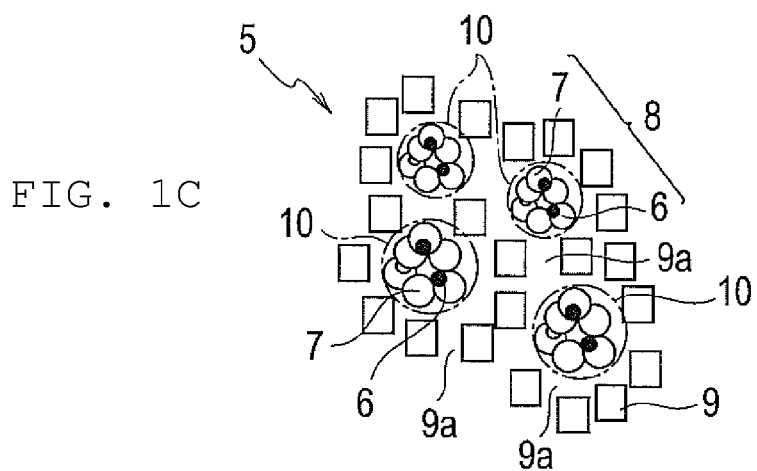

FIGS. 1A-1C show an exhaust gas purifying catalyst and an exhaust gas purifying catalyst structure according to the present embodiment. Note that, in this description, the exhaust gas purifying catalyst may simply be referred to as a catalyst, and the exhaust gas purifying catalyst structure may simply be referred to as a catalyst structure.

As shown in FIG. 1A, an exhaust gas purifying catalyst structure 1 includes a honeycomb substrate (a fire-resistant inorganic substrate) 2 having a plurality of cells 2a. Exhaust gas passes through the respective cells 2a in the exhaust gas flow direction F and comes into contact with catalyst layers so that the exhaust gas is purified.

The exhaust gas purifying catalyst structure 1 includes the catalyst layers formed on the inner surface of the substrate 2. In particular, as shown in FIG. 1B, a catalyst layer 3 and an undercoat layer 4 are formed on the inner surface of the substrate 2. As shown in FIG. 1C, the catalyst layer 3 contains a plurality of catalyst particles (an exhaust gas purifying catalyst) 5.

The catalyst particles 5 included in the catalyst layer 3 contain noble metal particles 6 and anchor particles 7. The noble metal particles 6 are supported on surfaces of the anchor particles 7 as an anchor material of the noble metal particles 7. The catalyst particles 5 further contain enclosure materials 9 that enclose composite particles 8 of the noble metal particles 6 and the anchor particles 7 to separate the adjacent composite particles 8 from each other.

In the catalyst particles 5, the noble metal particles 6 come into contact with the anchor particles 7 to be supported thereon so that the anchor particles 7 function as an anchor material by a chemical bond, thereby preventing movement of the noble metal particles 6. The anchor particles 7 on which the noble metal particles 6 are supported are covered and enclosed with the enclosure materials 9 so as to physically suppress the movement of the noble metal particles 6 enclosed in sections partitioned by the enclosure materials 9 beyond the respective sections. Furthermore, since the anchor particles 7 are enclosed in the sections partitioned by the enclosure materials 9, mutual contact and aggregation of the respective anchor particles 7 beyond the sections partitioned by the enclosure materials 9 are prevented. Accordingly, not only the aggregation of the anchor particles 7 but also the aggregation of the noble metal particles 6 supported on the anchor particles 7 can be prevented. As a result, the catalyst particles 5 can suppress a decrease in catalytic activity caused by the aggregation of the noble metal particles 6 without an increase in manufacturing cost and environmental load. Moreover, activity improvement of the noble metal particles 6 due to the anchor particles 7 can be maintained.

The catalyst particles 5 shown in FIG. 1C include catalyst units 10, in the regions partitioned by the enclosure materials 9, containing the noble metal particles 6 and secondary particles in which primary particles of the anchor particles 7 are aggregated. However, the anchor particles 7 may be present as primary particles in the regions partitioned by the enclosure materials 9. Namely, the catalyst units 10 may contain the noble metal particles 6 and the primary particles of the anchor particles 7.

As described above, since both the noble metal particles 6 and the anchor particles 7 are enclosed with the enclosure materials 9, the aggregation of the noble metal particles 6 can be prevented. It should be noted that, if the catalyst is used at higher temperature which exceeds 900° C., the aggregation of the noble metal particles may be caused. The mechanism of the aggregation of the noble metal particles even with such an enclosing structure may include the following steps.

Step 1: The noble metal particles are pushed onto surfaces of the anchor particles because of heat aggregation and crystal growth of the anchor particles so that the noble metal particles grow on the anchor particles (refer to FIG. 2A).

Step 2: After the particle growth, the noble metal particles pushed onto the peripheries of the anchor particles move to the enclosure materials from interfaces between the anchor particles and the enclosure materials (refer to FIG. 2B).

Step 3: The noble metal particles having moved onto the enclosure materials move and gather in association with crystal growth of the enclosure materials so that the noble metal particles further grow (refer to FIG. 2B).

Figure 2A:
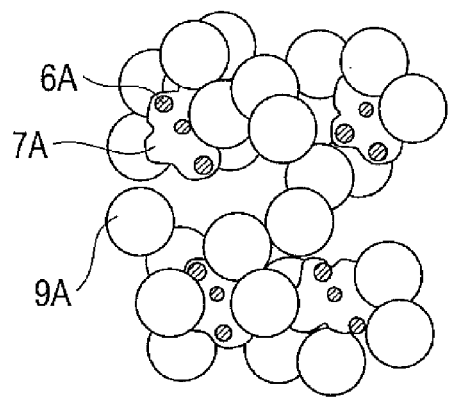
FIGS. 2A-2D are schematic views showing a mechanism of aggregation of noble metal particles.
Figure 2B:
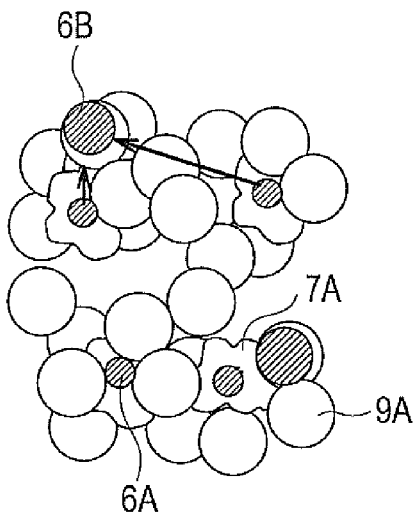

In Step 1, as shown in FIG. 2A, the noble metal particles 6A are aggregated inside the catalyst units 10. As described below, even if the noble metal particles 6A are aggregated, the diameter of each of the noble metal particles 6A can be kept as small as 10 nm because the amount of noble metal present inside the single catalyst unit 10 is small so as to prevent a decrease in purification performance. However, when the catalyst temperature exceeds 900° C., a chemical bond between the noble metal particles 6A and the anchor particles 7A decreases because of heat vibration. As a result, as shown in FIG. 2B, the noble metal particles 6A having grown inside the catalyst units 10 easily move onto the enclosure materials 9A from the interfaces between the anchor particles 7A and the enclosure materials 9A. In particular, when the catalyst temperature is 950° C. or higher and the noble metal is palladium, a reduction reaction from palladium oxide (PdO) to Pd metal easily progresses. When the catalyst temperature reaches and exceeds 960° C., the Pd metal moves to and is aggregated on the enclosure materials 9A, which may produce noble metal particles 6B having larger particle diameters with a high probability.

Therefore, in order to suppress particle growth of the noble metal particles in Step 3, the present invention is characterized in that a function to anchor the noble metal particles that the anchor particles conventionally have is also applied to the enclosure materials. The anchor function applied to the enclosure materials can prevent the noble metal particles from moving on the surfaces of the enclosure materials even when the noble metal particles move to the enclosure materials, so as to suppress sintering of the respective noble metal particles.

In order to apply the anchor function to the enclosure materials, the enclosure materials contain at least one of an alkali element and an alkaline-earth element. The inclusion of at least one of the alkali element and the alkaline-earth element provides a chemical bond between the enclosure materials and the noble metal particles so as to prevent the movement of the noble metal particles. In particular, simulations by means of a density functional theory described below revealed that the case where the enclosure materials contain the alkali element and the alkaline-earth element decreases adsorption stabilization energy of the noble metal particles to the enclosure materials compared with the case of not containing the alkali element and the alkaline-earth element. Therefore, the movement of the noble metal particles on the surfaces of the enclosure materials is conceived to be prevented since the inclusion of the alkali element and the alkaline-earth element in the enclosure materials brings a chemical interaction between the noble metal particles and the enclosure materials so as to stabilize the particles. Hereinafter, the alkali element and the alkaline-earth element may also be referred to as "alkali elements".

The catalyst particles according to the present embodiment are required to not only contain the alkali elements in the enclosure materials but also contain at least one of the alkali element and the alkaline-earth element in the anchor particles. As described above, the inclusion of the alkali elements in the enclosure materials prevents the movement of the noble metal particles on the enclosure materials. Further, the inclusion of the alkali elements in the anchor particles also prevents the movement of the noble metal particles on the anchor particles. In other words, even when the anchor particles do not contain the alkali elements, the movement and aggregation of the noble metal particles can be suppressed due to the interaction between the anchor particles and the noble metal particles. In the present embodiment, the anchor particles also contain the alkali elements so as to further enhance the interaction between the anchor particles and the noble metal particles. Accordingly, the movement of the noble metal particles onto the enclosure materials in Step 2 can be prevented.

Figure 2C:
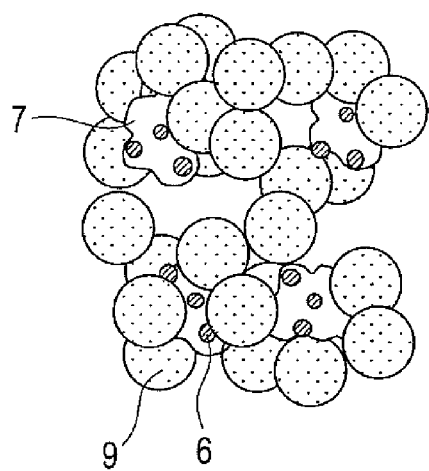
Figure 2D:
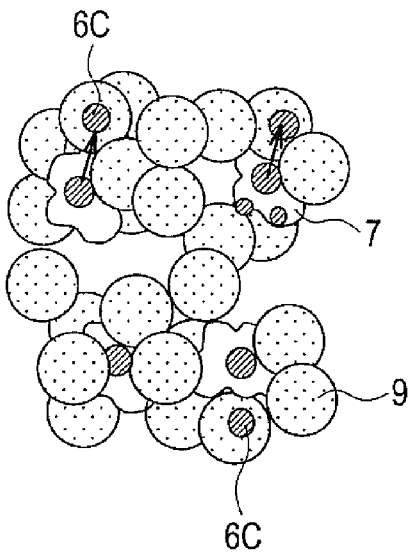

As described above, in the catalyst (the catalyst particles) 5 of the present embodiment, as shown in FIG. 2C, both the anchor particles 7 and the enclosure materials 9 contain at least one of the alkali element and the alkaline-earth element. As a result, the anchor effect of the anchor particles 7 increases so as to prevent the noble metal particles 6 from moving from the anchor particles 7 onto the enclosure materials 9. In addition, the aggregation of the noble metal particles 6C can be prevented due to the anchor effect of the enclosure materials 9 even if the noble metal particles 6 move onto the surfaces of the enclosure materials 9. As a result, the noble metal particles 6C can be kept in a fine state even if the catalyst temperature reaches higher temperature exceeding 900° C., so as to keep high purification performance immediately after the manufacture.

The aggregation of the noble metal particles can be prevented as long as the alkali element and the alkaline-earth element are contained in the enclosure materials and the anchor particles. In other words, the alkali element and the alkaline-earth element may be supported on surfaces of the enclosure materials and the anchor particles or may be present inside the enclosure materials and the anchor particles as a mixture. Alternatively, elements included in the enclosure materials and the anchor particles may form a solid solution together with the alkali element and the alkaline-earth element. Namely, since the inclusion of the alkali element and the alkaline-earth element in the enclosure materials and the anchor particles increases the chemical interaction with the noble metal particles, the mixture state of the alkali elements may be any state.

Each of the alkali element and the alkaline-earth element contained in the enclosure materials and the anchor particles is preferably at least one element selected from the group consisting of sodium (Na), potassium (K), rubidium (Rb), cesium (Cs), magnesium (Mg), calcium (Ca), strontium (Sr), and barium (Ba). The inclusion of these alkali elements increases the anchor effect between the enclosure materials or the anchor particles and the noble metal particles so as to prevent aggregation of the noble metal particles. Among these elements, at least one element selected from the group consisting of magnesium (Mg), calcium (Ca), strontium (Sr), and barium (Ba) is particularly preferably contained in the enclosure materials and the anchor particles. Simulations by means of the density functional theory revealed that these elements particularly decrease the adsorption stabilization energy of the noble metal particles so that further enhancement of the anchor effects of the enclosure materials and the anchor particles can be expected. The alkali element and the alkaline-earth element are preferably contained in the enclosure materials and the anchor particles in an oxide state.

The total content of the alkali element and the alkaline-earth element contained in the enclosure materials with respect to the content of the noble metal particles, is preferably in the range from 0.5 to 2.0 in terms of a molar ratio. Namely, the ratio (the total content of the alkali element and the alkaline-earth element contained in the enclosure materials in the exhaust gas purifying catalyst)/(the content of the noble metal particles in the exhaust gas purifying catalyst) is preferably in the range from 0.5 to 2.0 in terms of a molar ratio. When the content of the alkali elements per unit mass in the exhaust gas purifying catalyst is within such a range, movement of the noble metal particles on the surfaces of the enclosure materials can be prevented, and sintering of the respective noble metal particles can be suppressed. The total content of the alkali element and the alkaline-earth element with respect to the content of the noble metal particles, is more preferably in the range from 0.8 to 1.5 in terms of a molar ratio. Due to such a range, the sintering of the noble metal particles can be further suppressed. Here, even when the total content of the alkali element and the alkaline-earth element in the enclosure materials is not within such a range, the effects of the present invention may be achieved. However, if the content is excessive, a decrease in enclosing ability due to a decrease in specific surface area of the enclosure materials or a decrease in gas dispersibility due to a decrease of pores of the enclosure materials may be caused, which may result in a decrease in catalytic performance. If the content is not sufficient, the anchor effect cannot be obtained sufficiently and the particle growth of the noble metal particles on the enclosure materials cannot be prevented, which may also result in a decrease in catalytic performance.

As the noble metal particles 6, at least one element selected from the group consisting of platinum (Pt), palladium (Pd), rhodium (Rh), gold (Au), silver (Ag), iridium (Ir) and ruthenium (Ru) may be used. Among these, platinum (Pt), palladium (Pd) and rhodium (Rh) can particularly exert higher purification performance.

Among these element, palladium (Pd) is particularly preferably used as the noble metal particles 6. Palladium has excellent purification performance at higher temperature. In addition, palladium particularly decreases the adsorption stabilization energy of the noble metal particles to magnesium (Mg), calcium (Ca), strontium (Sr) and barium (Ba). Therefore, when these elements are contained in the enclosure materials and the anchor particles as the alkali elements, sintering of palladium on the surfaces of the enclosure materials and the anchor particles can greatly be prevented. As a result, palladium can be kept in a fine state even at high temperature, thereby purifying exhaust gas efficiently.

The anchor particles 7 may contain at least one compound selected from the group consisting of aluminum oxide ($Al_2O_3$), cerium oxide ($CeO_2$), zirconium oxide ($ZrO_2$), yttrium oxide ($Y_2O_3$) and neodymium oxide ($Nd_2O_3$) as a main component. Among these, the anchor particles 7 preferably contain $Al_2O_3$ or $ZrO_2$ as a main component since $Al_2O_3$ and $ZrO_2$ have excellent resistance to high temperature and can keep high specific surface areas. Note that, in this description, the main component is a component of which content in the particle is greater than or equal to 50% by mole.

The enclosure materials 9 preferably contain at least one of aluminum (Al) and silicon (Si). The enclosure materials 9 preferably contain a material that can enclose the anchor particles and ensure gas permeability. In view of this, a compound containing at least one of Al and Si, such as $Al_2O_3$ and $SiO_2$, with a large pore volume is used so as to ensure high gas dispersibility. Thus, the enclosure materials 9 preferably contain $Al_2O_3$ or $SiO_2$ as a main component and further contain at least one of the alkali element and the alkaline-earth element. Alternatively, the enclosure materials may be a composite compound of Al and Si.

Here, the enclosure materials 9 used in the catalyst particles 5 do not completely cover the peripheries of the catalyst units 10. That is, the enclosure materials 9 have fine pores sufficient to allow exhaust gas and active oxygen to pass there through, while covering the catalyst units 10 in a manner as to sufficiently prevent a physical movement of the catalyst units 10. In particular, as shown in FIG. 1C, the enclosure materials 9 moderately enclose the catalyst units 10 and prevent aggregation of the respective catalyst units. In addition, since the enclosure materials 9 have a plurality of fine pores 9a, the exhaust gas and the active oxygen are allowed to pass through the fine pores 9a. Pore diameters of the fine pores 9a are preferably 30 nm or smaller, more preferably in the range from 10 nm to 30 nm. The pore diameters may be obtained by a gas adsorption method.

As described above, alumina or silica may be used for the enclosure materials 9. When the enclosure materials contain alumina, boehmite (AlOOH) is preferably used as a precursor. That is, the anchor particles 7 supporting the noble metal particles 6 are added to slurry obtained in a manner such that boehmite is dispersed in a solvent such as water, and the mixture is then stirred. Accordingly, the boehmite adheres to peripheries of the anchor particles 7. Subsequently, the mixed slurry is dried and baked, so that the boehmite is dehydrated and condensed at the peripheries of the anchor particles 7. As a result, the enclosure materials containing γ-alumina derived from the boehmite is formed. The enclosure materials thus obtained containing the boehmite-derived alumina have excellent gas permeability while covering the anchor particles 7 since the enclosure materials have a large number of fine pores having a size of 30 nm or smaller.

Similarly, when the enclosure materials contain silica as a main component, silica sol and zeolite are preferably used as a precursor. That is, the anchor particles 7 supporting the noble metal particles 6 are added to slurry obtained in a manner such that the silica sol and zeolite are dispersed in a solvent, and the slurry is stirred and then dried and baked, so that the enclosure materials containing silica is formed. The enclosure materials thus obtained containing silica derived from the silica sol and zeolite also have excellent gas permeability while covering the anchor particles 7 since the enclosure material has a large number of fine pores having a size of 30 nm or smaller.

An average particle diameter of the catalyst units 10 enclosed in the sections partitioned by the enclosure materials 9 is preferably 300 nm or smaller. Therefore, an average secondary particle diameter of the anchor particles 7 included in the catalyst units 10 is also preferably 300 nm or smaller. In such a case, the noble metal can be kept in a fine particle state. More preferably, the average particle diameter of the catalyst units 10 and the average secondary particle diameter of the anchor particles are 200 nm or smaller. Since such particle diameters further decrease the amount of the noble metal supported on the secondary particles of the anchor particles, aggregation of the noble metal can be suppressed. The lower limit of each of the average particle diameter of the catalyst units 10 and the average secondary particle diameter of the anchor particles 7 is not particularly limited but may be 5 nm. However, as described below, the average particle diameter of the catalyst units 10 is preferably larger than the average pore diameter of the fine pores 9a formed in the enclosure materials 9. Therefore, the average particle diameter of the catalyst units 10 and the average secondary particle diameter of the anchor particles 7 are preferably larger than 30 nm.

The average secondary particle diameter of the anchor particles may be obtained by analysis of slurry containing the anchor particles in the production process of the catalyst particles by use of a laser diffraction particle size distribution analyzer. Note that the average secondary particle diameter in this case is a median diameter (D50). Alternatively, the average secondary particle diameters of the anchor particles and particle diameters of the noble metal particles described below may be measured from photographs of obtained catalyst powder with a transmission electron microscope (TEM). In addition, the average particle diameters of the catalyst units 10 may also be measured from the TEM photographs.

An average particle diameter of the noble metal particles 6 is preferably in the range from 2 nm to 10 nm inclusive. When the average particle diameter of the noble metal particles 6 is 2 nm or greater, sintering caused by the movement of the noble metal particles themselves can be suppressed. When the average particle diameter of the noble metal particles 6 is 10 nm or smaller, a decrease in reactivity with exhaust gas can be prevented.

With regard to the catalyst units 10 including the noble metal particles 6 and the anchor particles 7, an average particle diameter Da of the catalyst units 10 and an average pore diameter Db of the fine pores 9a formed in the enclosure materials 9 enclosing the catalyst units 10 preferably fulfill the condition of Db<Da. As shown in FIG. 1C, the condition of Db<Da means that the average particle diameter Da of the catalyst units 10 is larger than the average pore diameter Db of the fine pores 9a in the enclosure materials 9. When the condition of Db<Da is fulfilled, the composite particles 8 of the noble metal particles 6 and the anchor particles 7 are prevented from moving through the fine pores 9a formed in the enclosure materials 9. Accordingly, aggregation of the respective composite particles 8 enclosed in the different sections can be suppressed.

Figure 3:
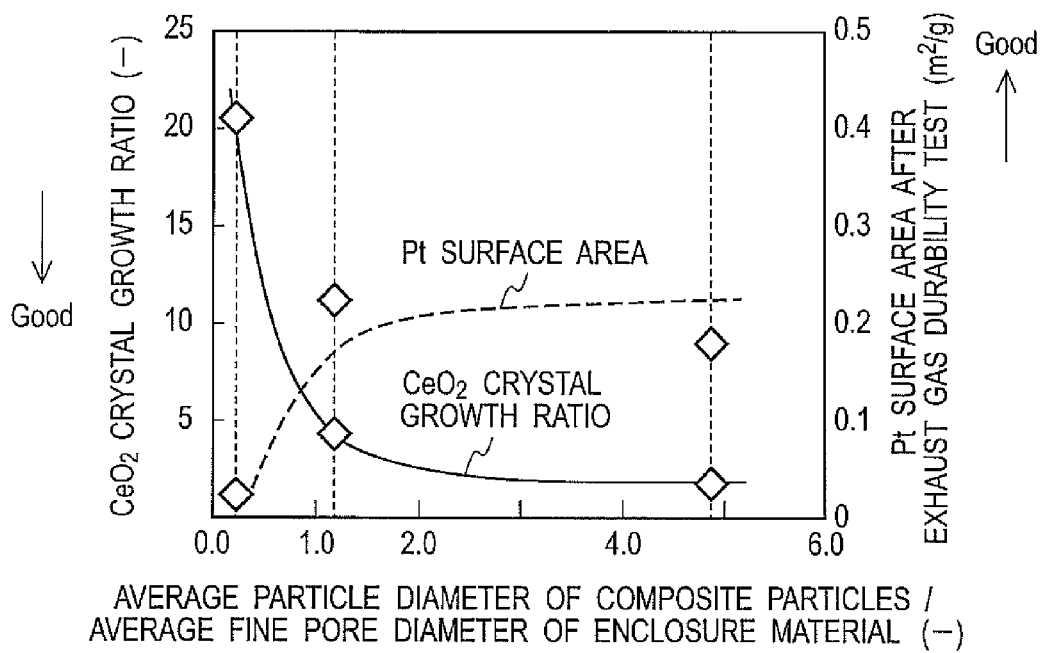
FIG. 3 is a graph showing a relationship between a ratio Da/Db of an average particle diameter Da of composite particles to an average pore diameter Db of enclosure materials before an exhaust gas durability test represented on a horizontal axis, and a crystal growth ratio of $CeO_2$ and a surface area of Pt after an exhaust gas durability test represented on a vertical axis.

The effect derived from the inequality Db<Da has been confirmed by experiments by the inventors. FIG. 3 is a graph showing a relationship between a ratio Da/Db of the average particle diameter Da of the composite particles 8 to the average pore diameter Db of the enclosure materials before an exhaust gas durability test represented on a horizontal axis, and a crystal growth ratio of ceria as the anchor particles 7 and a surface area of platinum as the noble metal particles 6 after the exhaust gas durability test represented on a vertical axis. According to FIG. 3, it is understood that, when Da/Db is greater than 1, the crystal growth ratio of $CeO_2$ significantly decreases, and the degree of sintering of $CeO_2$ is low. It is also understood that the large surface area of Pt is maintained even after the durability test and aggregation of Pt is suppressed.

In addition, 80% or more of the noble metal particles 6 are preferably in contact with the anchor particles 7. When the ratio of the noble metal particles 6 in contact with the anchor particles 7 is less than 80%, sintering may progress by the movement of the noble metal particles 6 since the noble metal particles 6 not present on the anchor particles 7 increase.

The anchor particles 7 are preferably an oxide further containing at least one element selected from the group consisting of iron (Fe), manganese (Mn), cobalt (Co), nickel (Ni) and neodymium (Nd). Namely, as described above, the anchor particles 7 contain alumina or zirconia as a main component. In addition, the anchor particles preferably contain the transition metal described above as an additive. When at least one transition metal is contained in the anchor particles, a catalytic activity, especially a purification rate of CO and NOx, can be improved due to active oxygen contained in the transition metal.

The noble metal particles 8 are preferably contained in each section partitioned by the enclosure materials 9 with the amount of $8\times10^{-20}$ mol or less in total. That is, the number by mole of the noble metal particles 6 in each catalyst unit 10 is preferably $8\times10^{-20}$ mol or less. In each section partitioned by the enclosure materials 9, the several noble metal particles 6 may move to be aggregated under high temperature conditions. In such a case, the noble metal particles 6 are formed into one or more aggregates on the surfaces of the anchor particles 7.

Figure 4:
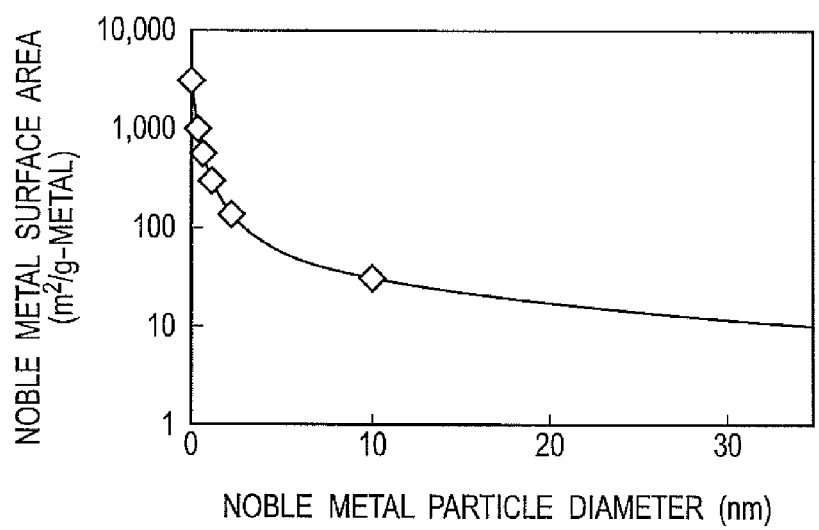
FIG. 4 is a graph showing a relationship between a particle diameter and a surface area of noble metal.

Here, in the case in which the noble metal particles 6 are aggregated in one catalyst unit 10, and the particle diameter of the aggregated noble metal particles 6 is 10 nm or smaller, the noble metal particles 6 exhibit sufficient catalytic activity and suppress deterioration of the catalytic activity caused by the aggregation thereof. FIG. 4 is a graph showing a relationship between a particle diameter and a surface area of platinum or palladium as noble metal. Note that, in FIG. 4, platinum and palladium are shown as one curve since platinum and palladium have substantially the same relationship between the particle diameter and the surface area thereof. As is apparent from FIG. 4, since the particle surface area of the noble metal is large when the particle diameter of the noble metal is 10 nm or smaller, deterioration in catalytic activity caused by the aggregation can be suppressed.

Figure 5:
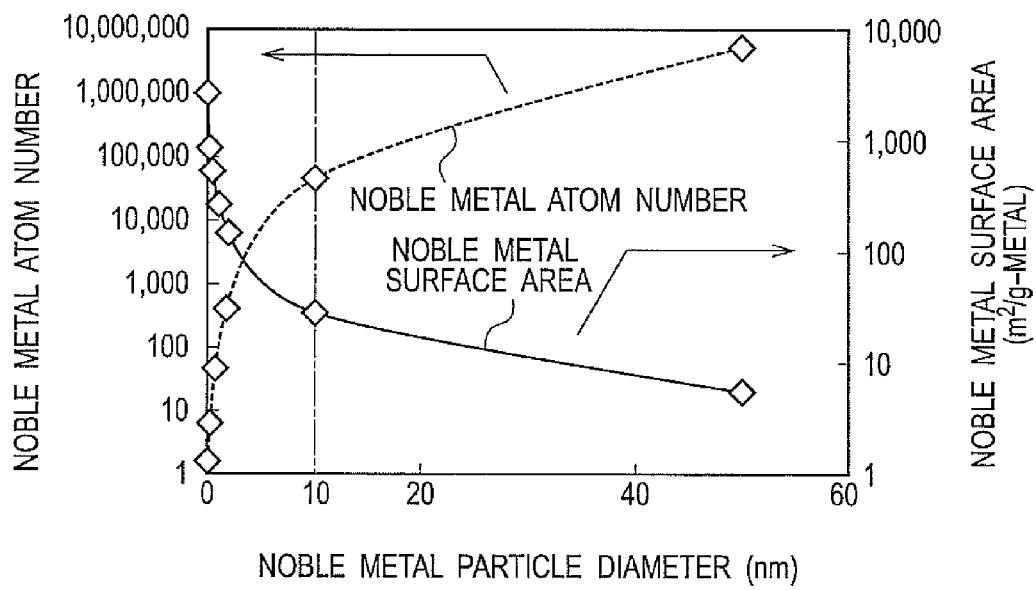
FIG. 5 is a graph showing a relationship between a particle diameter, and a number of atoms and a surface area of noble metal.

FIG. 5 is a graph showing a relationship between the particle diameter and the number of atoms of platinum or palladium as noble metal. Note that, in FIG. 5, platinum and palladium are shown as one curve since platinum and palladium have substantially the same relationship. As is apparent from FIG. 5, the number of atoms is approximately 48000 when the particle diameter of the noble metal is 10 nm, which is approximately $8\times10^{-20}$ mol when converting into the number of moles. In view of this, when the amount of the noble metal in each catalyst unit 10 is controlled and set to $8\times10^{-20}$ mol or less, deterioration in catalytic activity can be prevented even if the noble metal is aggregated into one mass in one catalyst unit 10. An example of the method of setting the amount of the noble metal contained in one catalyst unit 10 to $8\times10^{-20}$ mol or less, may be to decrease the diameters of the anchor particles 7 supporting the noble metal particles 6.

In the catalyst particles 5 shown in FIG. 1C, when adsorption stabilization energy of the noble metal particles 6 to the anchor particles 7 is defined as Ea, and adsorption stabilization energy of the noble metal particles 6 to the enclosure materials 9 is defined as Eb, Ea preferably has a smaller value than Eb (Ea<Eb). When the adsorption stabilization energy Ea of the noble metal particles 6 to the anchor particles 7 is smaller than the adsorption stabilization energy Eb of the noble metal particles 6 to the enclosure materials 9, the noble metal particles 6 can be prevented from moving onto the enclosure materials 9. As a result, the aggregation of the noble metal particles 6 can be further suppressed.

In addition, the difference (Eb−Ea) between the adsorption stabilization energy Ea of the noble metal particles 6 to the anchor particles 7 and the adsorption stabilization energy Eb of the noble metal particles 6 to the enclosure materials 9, preferably exceeds 10.0 cal/mol. When the difference between the respective adsorption stabilization energies exceeds 10.0 cal/mol, the noble metal particles 6 can be more surely prevented from moving onto the enclosure materials 9.

Here, the adsorption stabilization energy Ea of the noble metal particles 6 to the anchor particles 7 and the adsorption stabilization energy Eb of the noble metal particles 6 to the enclosure materials 9 may be calculated by simulations by use of a density functional theory. This density functional theory is a method of predicting an electronic state of a crystal by introducing a Hamiltonian that takes in a correlation effect among a large number of electrons. The principle of the density functional theory is based on a mathematical theorem that the entire energy of a ground state of a system can be represented by an electron density functional theory. The density functional theory has high reliability as a method of calculating the electronic state of the crystal.

This density functional theory is suitable for predicting electronic states in the interfaces between the anchor particles 7 or the enclosure materials 9 and the noble metal particles 6. It has been ascertained that the catalyst of the present embodiment, which is designed based on the combination of the noble metal particles, the anchor particles and the enclosure materials selected according to actual simulation values, does not easily cause coarsening of the noble metal particles and maintains high purification performance even after a high-temperature durability test. Analysis software for simulations by use of the density functional theory as described above is commercially available, and an example of the calculation conditions of the analysis software may be as follows.

Pre/post: Materials studio 3.2 (Accelrys Software Inc.); Solver: DMol3 (Accelrys Software Inc.); temperature: absolute zero; Approximation: GGA approximation.

In the exhaust gas purifying catalyst structure 1 according to the present embodiment, as shown in FIG. 1B, the undercoat layer 4 containing an inorganic oxide having heat resistance may be provided under the catalyst layer 3 containing the catalyst 5. The undercoat layer 4 is mainly provided on corners of each cell 2a of the honeycomb substrate 2. Therefore, a catalyst active component in the catalyst layer covering the undercoat layer 4 is prevented from being present locally on the cell corners, a decrease in the amount of the catalyst active component to be provided on cell flat portions (on cell walls) is suppressed, and the catalyst layer is prevented from coming off the substrate. An example of the inorganic oxide having heat resistance in the undercoat layer may be alumina.

As explained above, the exhaust gas purifying catalyst 5 according to the present embodiment includes the plural catalyst units 10 containing the noble metal particles 6 and the anchor particles 7 serving as an anchor material of the noble metal particles 6 and supporting the noble metal particles. The catalyst 5 further includes the enclosure materials 9 that enclose the plural catalyst units 10 and separate the catalyst units 10 from each other. The anchor particles 7 and the enclosure materials 9 contain at least one of the alkali element and the alkaline-earth element. The anchor effects of the anchor particles 7 and the enclosure materials 9 can prevent movement and aggregation of the noble metal particles 6. As a result, even when the catalyst temperature reaches high temperature exceeding 900° C., the noble metal particles 6 can be kept in a fine state so as to keep high purification performance.

The exhaust gas purifying catalyst structure 1 according to the present embodiment includes the catalyst layer 3 containing the exhaust gas purifying catalyst 5, and the fire-resistant inorganic substrate 2 supporting the catalyst layer 3. As described above, the exhaust gas purifying catalyst 5 of the present embodiment can keep the noble metal particles in a fine state even at 900° C. or higher. When the catalyst layer 3 is formed in a manner such that the catalyst 5 is applied to the fire-resistant inorganic substrate 2, the pressure loss of the catalyst layer 3 decreases so that heat stability/thermal shock resistance and mechanical strength increase.

Second Embodiment

Hereinafter, a catalyst according to a second embodiment will be explained in detail with reference to the drawings. It should be noted that the same elements in the following explanations of the drawings are indicated by the same reference numerals, and overlapping explanations thereof are not repeated.

Figure 6:
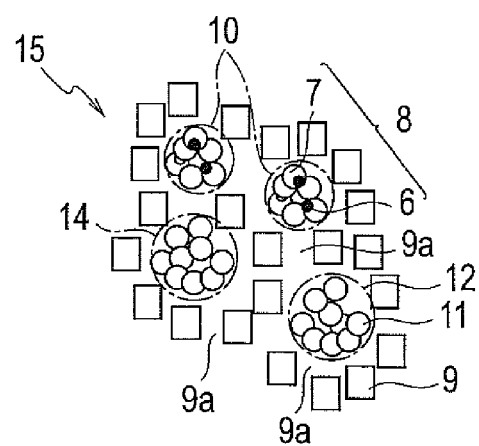
FIG. 6 is a schematic view showing an exhaust gas purifying catalyst according to a second embodiment of the present invention.

An exhaust gas purifying catalyst (catalyst particles) 15 according to the present embodiment contains the noble metal particles 6, the anchor particles 7 and first promoter particles 11 as shown in FIG. 6. The noble metal particles 6 are supported on the surfaces of the anchor particles 7 as an anchor material of the noble metal particles 6. The first promoter particles 11 are contained without coming into contact with the noble metal particles 6 and have an oxygen storage and release capacity. The catalyst particles 15 contain the enclosure materials 9 that enclose both the composite particles 8 of the noble metal particles 6 and the anchor particles 7 and the first promoter particles 11 and separate the composite particles 8 from the first promoter particles 11.

In the catalyst particles 15, the noble metal particles 6 are supported on and in contact with the anchor particles 7 so as to prevent movement of the noble metal particles 6, in the same manner as the catalyst particles 5 according to the first embodiment. In addition, the anchor particles 7 on which the noble metal particles 6 are supported are covered and enclosed with the enclosure materials 9 so as to physically suppress the movement of the noble metal particles 6 enclosed in sections partitioned by the enclosure materials 9 beyond the respective sections. Furthermore, since the anchor particles 7 are enclosed in the sections partitioned by the enclosure materials 9, mutual contact and aggregation of the respective anchor particles 7 beyond the sections partitioned by the enclosure materials 9 are prevented.

In addition, in the catalyst particles 15, the first promoter particles 11 having an oxygen storage and release capacity are covered and enclosed with the enclosure materials 9 so as to further prevent physical movement of the first promoter particles 11. The enclosure of the first promoter particles 11 in the sections partitioned by the enclosure materials 9 prevents mutual contact and aggregation of the first promoter particles 11 beyond the respective sections partitioned by the enclosure materials 9. As a result, aggregation of the first promoter particles 11 and a decrease in specific surface area due to the aggregation can be prevented even if the first promoter particles 11 having relatively low heat resistance are subjected to high temperature exceeding 900° C.

As in the case of the first embodiment, both the anchor particles 7 and the enclosure materials 9 contain at least one of the alkali element and the alkaline-earth element described above. This inclusion increases the anchor effect of the anchor particles 7 and prevents the noble metal particles 6 from moving from the anchor particles 7 to the enclosure materials 9. Even if the noble metal particles 6 move onto the surfaces of the enclosure materials 9, aggregation of the noble metal particles 6 can be prevented due to the anchor effect of the enclosure materials 9. Accordingly, the noble metal particles 6 can be kept in a fine state so as to keep high purification performance even if the catalyst temperature exceeds 900° C.

The first promoter particles 11 preferably contain at least one of cerium (Ce) and praseodymium (Pr) that have an oxygen storage and release capacity. In particular, the first promoter particles 11 preferably contain a compound having a high oxygen storage and release capacity as a main component such as cerium oxide ($CeO_2$) or praseodymium oxide ($Pr_6O_{11}$). Since Ce and Pr each constitute multivalent oxides in which the oxidation number varies because of atmospheric fluctuations of exhaust gas, Ce and Pr are capable of storing and releasing active oxygen.

An average particle diameter of promoter units 12 enclosed in the sections partitioned by the enclosure materials 9 is preferably 1000 nm or smaller, more preferably 300 nm or smaller. Thus, an average secondary particle diameter of the first promoter particles 11 included in the promoter units 12 is also preferably 1000 nm or smaller, more preferably 300 nm or smaller. Due to such average particle diameters, surface areas of the first promoter particles 11 greatly increase so that a supply rate of active oxygen increases to enhance catalytic performance. A lower limit of each of the average particle diameter of the promoter units 12 and the average secondary particle diameter of the first promoter particles 11 is not particularly limited. However, as described below, the average particle diameter of the promoter units 12 is preferably larger than the average pore diameter of the fine pores 9a formed in the enclosure materials 9. Therefore, the average particle diameter of the promoter units 12 and the average secondary particle diameter of the first promoter particles 11 are preferably larger than 30 nm. The average secondary particle diameters of the first promoter particles may be obtained by analysis of slurry containing the promoter particles during the preparation of the catalyst particles by use of a laser diffraction particle size distribution analyzer. Note that the average secondary particle diameter in this case is a median diameter (D50).

With regard to the catalyst units 10 including the noble metal particles 6 and the anchor particles 7, the average particle diameter Da of the catalyst units 10 and the average pore diameter Db of the fine pores 9a formed in the enclosure materials 9 enclosing the catalyst units 10 preferably fulfill the condition of Db<Da, as described above. As in the case of the catalyst units 10, an average particle diameter Dc of the promoter units 12 and the average pore diameter Db of the fine pores 9a formed in the enclosure materials 9 enclosing the promoter units 12 preferably fulfill the condition of Db<Dc. That is, as shown in FIG. 6, the condition of Db<Dc means that the average particle diameter Dc of the promoter units 12 is larger than the average pore diameter Db of the fine pores 9a in the enclosure materials 9. When the condition of Db<Dc is fulfilled, the first promoter particles 11 are prevented from moving through the fine pores 9a formed in the enclosure materials 9. Accordingly, the aggregation of the respective first promoter particles enclosed in the different sections can be reduced. As a result, the large surface areas of the first promoter particles can be maintained so that active oxygen on the surfaces of the particles can be adsorbed and released efficiently.

The first promoter particles are preferably an oxide further containing at least one element selected from the group consisting of iron (Fe), manganese (Mn), cobalt (Co) and nickel (Ni). Namely, the first promoter particles contain cerium oxide or praseodymium oxide as a main component. In addition, the first promoter particles preferably contain the transition metal described above as an additive. When at least one transition metal is contained in the first promoter particles, a catalytic activity, especially a purification rate of CO and NO, can be improved due to active oxygen contained in the transition metal.

In the catalyst particles 15, the noble metal particles 6 may be rhodium (Rh) and the anchor particles 7 may be an oxide containing at least zirconium (Zr). Although catalytic performance of Rh tends to easily decrease in a high oxidation state, a higher oxidation state and aggregation of Rh can be suppressed by a proper adjustment of distances between the anchor particles and the first promoter particles.

The higher oxidization state of Rh may be observed according to binding energy analysis by use of an X-ray photoelectron spectroscopy (XPS). In general, it is well known that 3d5 orbital binding energy of Rh is 307.2 eV in a metal state, and is approximately 310.2 eV in a high oxidation state. When an oxide such as $Al_2O_3$ or $ZrO_2$ is used as an anchor material, the 3d5 orbital binding energy of Rh is preferably 308.8 eV or less since a decrease in catalytic performance is caused when the 3d5 orbital binding energy is 308.8 eV or greater. The 3d5 orbital binding energy of Rh may be adjusted to 308.8 eV or less by a proper adjustment of distances between the anchor particles and the first promoter particles. At the time of measuring the binding energy, a charge correction is generally carried out using a particular element, and the binding energy of the element with a large content is corrected with respect to a literature value. For example, hydrocarbon contained in oil mist or the like derived from a pump for keeping an X-ray photoelectron spectrometer in a high vacuum state is used, and a C1s peak of this hydrocarbon is compared with the literature value so as to carry out the correction.

As described above, when the noble metal particles 6 are rhodium, the anchor particles 7 are preferably an oxide containing zirconium as a main component. In the case in which the anchor particles 7 are an oxide containing alumina as a main component, rhodium and alumina form a solid solution and rhodium is subjected to higher oxidization, which may cause a decrease in catalytic activity. On the other hand, in the case of an oxide containing Zr, more preferably in the case of an oxide containing 50% or more of Zr in the anchor particles 7 in terms of atom %, a higher oxidization state and aggregation of Rh can be suppressed. Examples of such an oxide containing Zr as a main component include zirconia ($ZrO_2$), lanthanum-added zirconia (Zr—La—$O_x$), and lanthanum-cerium-added zirconia (Zr—La—Ce—$O_x$).

Here, a supply of active oxygen to noble metal is substantially important in an exhaust gas purifying catalyst for a vehicle in order to purify exhaust gas. Therefore, an oxygen storage component (OSC material), which is provided adjacent to noble metal and functions to adsorb and release active oxygen at the time of atmospheric fluctuations of exhaust gas, is a particularly essential material in order to improve the purification performance of the catalyst.

The following three conditions required for the exhaust gas purifying catalyst to which the OSC material is added are significantly important: (1) the amount of the OSC material in the catalyst (the amount of adsorbed and released oxygen); (2) the oxygen storage and release velocity of the OSC material; and (3) the distance between the noble metal and the OSC material.

With regard to the condition (1), if the amount of the OSC material in the catalyst is too small, sufficient active oxygen is not supplied to the noble metal in the case of a rich atmosphere. As a result, a decrease in purification performance of HC and CO is caused. If the amount of the OSC material is excessive, the active oxygen adsorbed by the OSC material is excessively released at the time of a large shift from a lean atmosphere to a stoichiometric or rich atmosphere. As a result, a decrease in purification performance of NOx is caused. Therefore, a predetermined optimal amount of the OSC material in the catalyst is required, and the optimal amount of the OSC material may be measured by experiments. The amount of the OSC material differs depending on the type of the noble metal and the amount of the noble metal used in the catalyst; however, the amount of the OSC material is generally 5 to 100 g/L in terms of $CeO_2$ conversion per unit content.

As the distance between the noble metal and the OSC material is closer, the efficiency of supply of the active oxygen increases when having the same amount of the OSC material in the exhaust gas purifying catalyst. Therefore, the active oxygen can be supplied to the noble metal in a shorter period of time at the time of atmospheric fluctuations. Thus, when the distance between the noble metal and the OSC material is close, the catalyst is conceived to achieve an improvement in performance that is the same effect as the improvement of the condition (2): the oxygen storage and release velocity of the OSC material, among the three conditions described above.

A specific method of reducing the distance between the noble metal and the OSC material may be to support the noble metal on the OSC material. However, the configuration in which the noble metal is supported on the OSC material is not necessarily appropriate because of the following reasons. First, a large decrease in specific surface area of the OSC material is caused under an exhaust gas atmosphere at high temperature compared with alumina or the like. Therefore, when the noble metal is supported on the OSC material, a decrease in specific surface area is likely to be caused because of aggregation of the noble metal. In addition, rhodium (Rh) tends to have a higher catalytic activity in a reduction state and tends to have a lower catalytic activity in a higher oxidation state among other noble metal elements. In the case in which rhodium is supported directly on the OSC material, active oxygen is supplied mainly at the interface between Rh and the OSC material and therefore, rhodium is subjected to a higher oxidation state. As a result, a decrease in catalytic performance may be caused.

On the other hand, in the configuration in which the noble metal is not supported directly on the OSC material, the supply of the active oxygen to the noble metal is delayed when there is a large distance between the OSC material and the noble metal. As a result, when a flow rate of exhaust gas rapidly changes during acceleration and the like and a catalytic atmosphere then varies, a purification reaction cannot comply with the change. Accordingly, a decrease in purification performance of the catalyst is caused.

Therefore, in the catalyst particles 15, an average distance between centers of the catalyst units 10 containing the noble metal particles 6 and the anchor particles 7 and centers of the promoter units 12 containing the first promoter particles 11 having an oxygen storage and release capacity, is preferably in the range from 5 nm to 300 nm. The average distance within such a range can supply the active oxygen efficiently to the noble metal and prevent a decrease in catalytic activity caused by excessive supply of the active oxygen. Particularly, the average distance between the centers of the catalyst units 10 and the centers of the promoter units 12 is more preferably in the range from 40 nm to 300 nm.

The distances between the catalyst units 10 and the promoter units 12 in the catalyst particles 15 may be measured according to the following steps:

(1) a TEM-EDX analysis or HAADF-STEM analysis of the catalyst particles 15;

(2) an outline extraction of the anchor particles and the first promoter particles from images;

(3) a setting of circular approximation and each central point from surface areas based on the extracted outlines; and (4) a detection of the closest central points and a measurement of the distances.

The method of the measurement of the distances is not limited to the above-described method, and may be any method as long as objectivization and repeatability can be ensured.

(1) TEM-EDX Analysis or HAADF Analysis of Catalyst Particles 15

The catalyst particles 15 are subjected to embedding treatment with epoxy resin and then curing treatment. Thereafter, an ultrathin piece is obtained by use of an ultramicrotome. By use of the ultrathin piece thus obtained, simultaneous enclosure particles are observed with a transmission electron microscope (TEM) or by high-angle annular dark-field scanning transmission electron microscopy (HAADF-STEM), so as to discriminate among the anchor particles, the first promoter particles and the enclosure materials. In particular, with regard to analysis conditions in the case of using TEM-EDX, the obtained images are focused on contrast (shadowed) areas first. Then, elemental species of the areas are analyzed, so as to identify compound particles containing the elements.

Although the elemental species of the anchor particles and the first promoter particles may overlap each other, the anchor particles supporting the noble metal are distinguishable from the first promoter particles by detecting the presence or absence of noble metal species with an energy dispersive X-ray analyzer (EDX). However, when the particle diameter of the noble metal is smaller than the diameter of X-ray beam diameter of the EDX, the noble metal may not be detected. In such a case, when the anchor particles and the first promoter particles contain cerium (Ce) or praseodymium (Pr) as the OSC material, it is preferable to discriminate between the anchor particles and the first promoter particles by comparing the contents of Ce or Pr in the anchor particles and the first promoter particles obtained preliminarily with a detection intensity ratio of Ce or Pr. In the case of using the HAADF-STEM images, the discrimination may be carried out according to contrasts.

(2) Outline Extraction of Anchor Particles and First Promoter Particle from Images The outline extraction of the anchor particles and the first promoter particle is carried out using the images obtained in the analysis of the step (1) described above. The extraction may be automatically carried out by contrasts using image processing software. Alternatively, the extraction may be manually carried out by transcription of the images on OHP sheets or the like.

(3) Definition of Circular Approximation and Each Central Point from Surface Areas Based on Extracted Outlines, and (4) Detection of Closest Central Point and Measurement of Distance The steps (3) and (4) may be carried out using commercially-available image processing software. That is, the areas of the anchor particles and the first promoter particles are calculated according to the extracted outlines, and circles having the same areas as the anchor particles and the first promoter particles are presumed. Then, a first promoter particle closest to a specific anchor particle is detected, and the distance between the centers of the respective circles is measured. Accordingly, the distance between the particles can be obtained.

Figure 7:
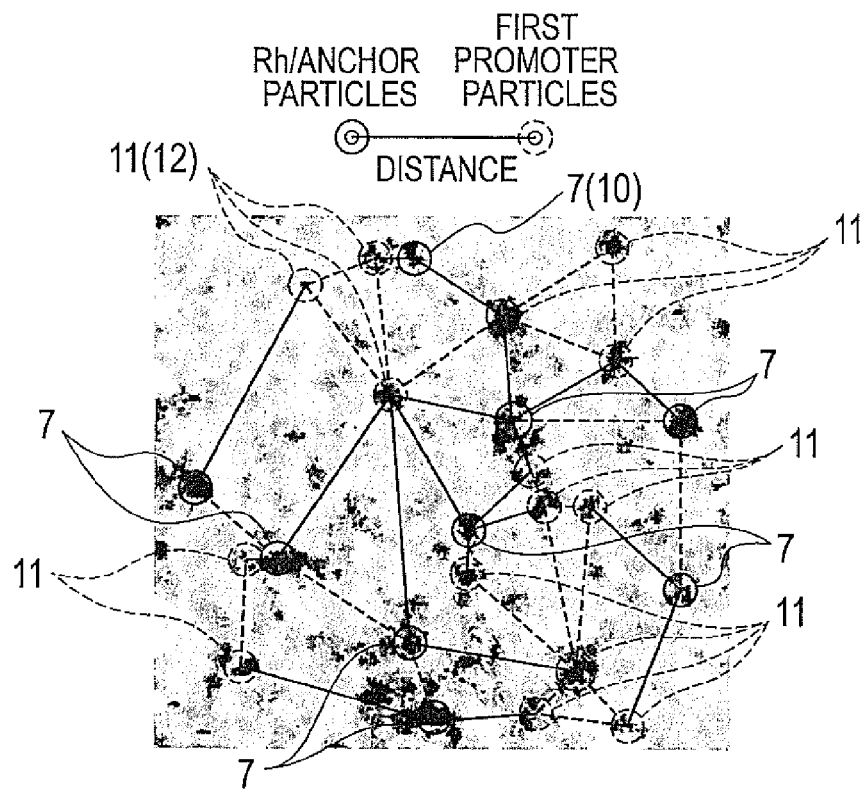
FIG. 7 is a micrograph showing distances between anchor particles and first promoter particles in the exhaust gas purifying catalyst according to the second embodiment.

FIG. 7 shows an example of a TEM-EDX photograph of the catalyst particles 15. As shown in FIG. 7, the photograph obtained by use of the TEM-EDX is subjected to image processing so as to extract outlines of the anchor particles 7 and the first promoter particles 11. Next, areas of the respective particles are calculated, and circles having the same areas as the respective particles are presumed. Then, the first promoter particle 11 (the promoter unit 12) closest to the specific anchor particle 7 (the catalyst unit 10) is detected, and the distance between the centers of the respective circles is measured. Note that, in FIG. 7, the lines connecting anchor particles 7 to the first promoter particles 11 are indicated by a solid line, and the lines connecting the respective anchor particles 7 or the lines connecting the respective first promoter particles 11 are indicated by a dashed line.

In addition, a degree of dispersion of each of the catalyst units 10 and the promoter units 12 in the simultaneous enclosure particles is preferably 40% or higher in the catalyst particles 15. The degree of dispersion may be obtained according to the following formula 1.

$$\text{Degree of dispersion}(\%) = 100 - \frac{\sigma(\text{nm})}{Av.(\text{nm})} \times 100$$

In the formula, "σ" represents a standard deviation of distribution of distances between the respective centers of the catalyst units 10 and the promoter units 12 in the catalyst particles 15. "Av." represents an average distance between the respective centers of the catalyst units 10 and the promoter units 12 in the catalyst particles 15.

Figure 8:
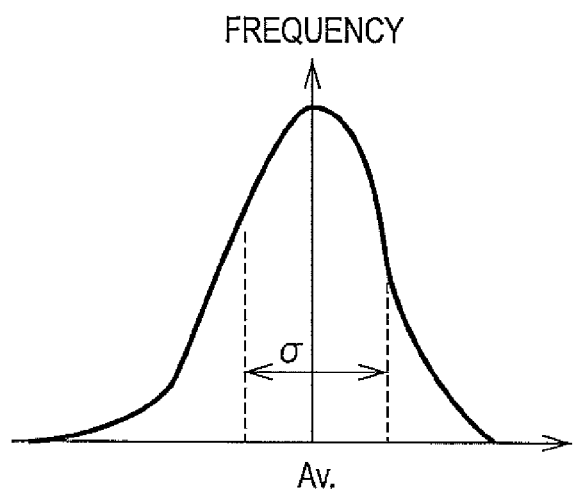
FIG. 8 is a graph showing a relationship between distances between respective centers of catalyst units and promoter units, and a frequency of appearance.

FIG. 8 is a graph showing a relationship between distances between the respective centers of the catalyst units 10 and the promoter units 12 in the catalyst particles 15, and frequency of appearance of the distances. As shown in FIG. 8, which is the graph obtained by the result of measurement of the distances between the respective centers of the catalyst units 10 and the promoter units 12, when a frequency distribution is conceived to be a normal distribution, the degree of dispersion is expressed as a probability of the presence of an arbitrary sample within the range of a. Here, the expression "σ represents a standard deviation" means that 68.27% of the distances between the respective centers of the catalyst units 10 and the promoter units 12 are distributed within the range of the average center distance Av (nm)±σ (nm).

Figure 9A:
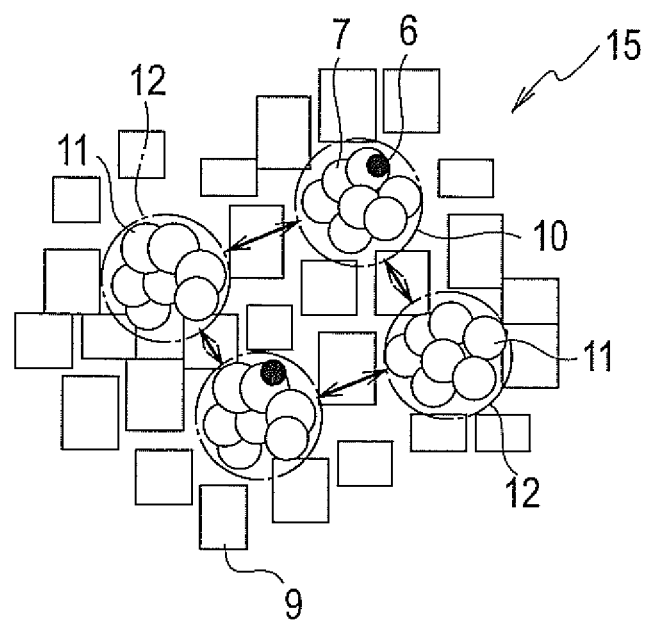
FIGS. 9A and 9B are schematic views showing examples of exhaust gas purifying catalysts having different degrees of dispersion.
Figure 9B:
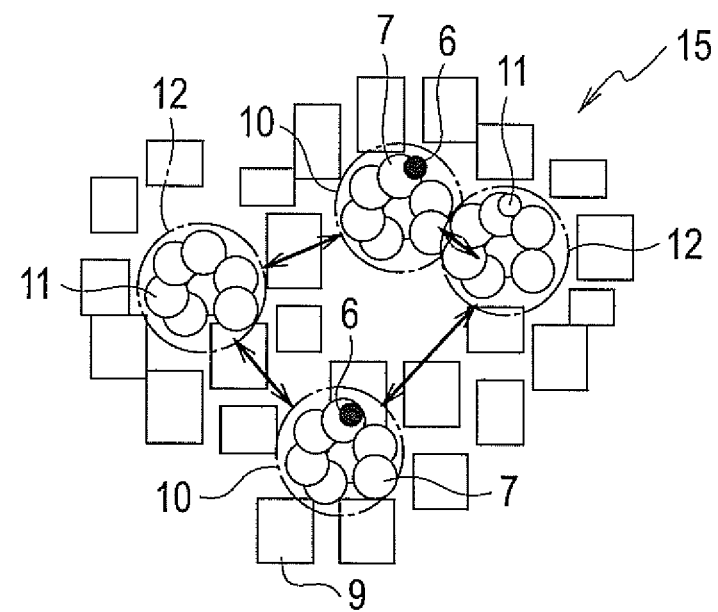

FIGS. 9A and 9B show a schematic view of an example of catalyst powder of which degree of dispersion is high (FIG. 9A), and a schematic view of an example of catalyst powder of which degree of dispersion is low (FIG. 9B). If all the distances between the catalyst units and the promoter units measured with TEM or the like would be equal, the degree of dispersion of the catalyst is 100% (this means that variations in distance is 0). When the variation in distance is large, the degree of dispersion of the catalyst approximates 0%. Namely, when all the distances between the catalyst units and the promoter units are geometrically equal, a is 0 and the degree of dispersion is 100%.

As described above, the degree of dispersion defined as such is preferably 40% or greater. When the degree of dispersion is 40% or greater, each distance between the respective particles is sufficiently ensured, and unevenness is decreased to a low level. As a result, aggregation of the respective compounds after a durability test is prevented. Particularly, the degree of dispersion is preferably 50% or greater.

This degree of dispersion is mutually related to the level of aggregation of the anchor particles and the first promoter particles immediately before drying slurry in which the anchor particles, the first promoter particles and the precursor of the enclosure materials are mixed in the process of preparing the catalyst particles 15. Since the level of aggregation depends on a stirring force of the slurry, the degree of dispersion can be improved when the slurry is intensively stirred.

As explained above, the exhaust gas purifying catalyst 15 according to the present embodiment includes the catalyst units 10 containing the noble metal particles 6 and the anchor particles 7 supporting the noble metal particles 6 serving as an anchor material of the noble metal particles 6. The catalyst 15 also includes the promoter units 12 containing the first promoter particles 11 contained without coming into contact with the noble metal particles 6 and having an oxygen storage and release capacity. The catalyst 15 further includes the enclosure materials 9 that enclose the catalyst units 10 and the promoter unit 12 and separate the noble metal particles 6 and the anchor particles 7 in the catalyst units 10 from the first promoter particles 11 in the promoter units 12. Both the anchor particles 7 and the enclosure materials 9 contain at least one of the alkali element and the alkaline-earth element. Due to the anchor effects of the anchor particles 7 and the enclosure materials 9, movement and aggregation of the noble metal particles 6 can be prevented. Accordingly, the noble metal particles 6 can be kept in a fine state so as to keep purification performance even if the catalyst temperature reaches high temperature exceeding 900° C. In addition, the catalyst 15 contains the first promoter particles 11 having an oxygen storage and release capacity in a manner as to be separated from the noble metal particles having a catalytic activity, and adjusts the distances between the anchor particles 7 in contact with the noble metal particles 6 and the first promoter particles 11 within a predetermined range. As a result, excessive oxidation of the noble metal particles 6 and a decrease in purification performance caused by a deficiency of oxygen supply can be prevented.

Third Embodiment

Hereinafter, a catalyst according to a third embodiment will be explained in detail with reference to the drawings. It should be noted that the same elements in the following explanations of the drawings are indicated by the same reference numerals, and overlapping explanations thereof are not repeated.

Figure 10A:
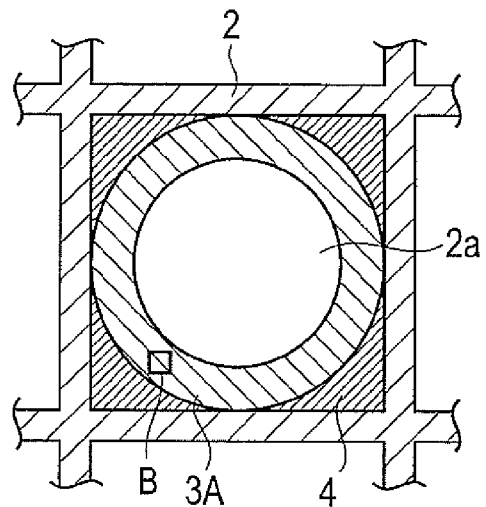
FIGS. 10A-10C are schematic views showing an exhaust gas purifying catalyst and an exhaust gas purifying catalyst structure according to a third embodiment of the present invention.
Figure 10B:
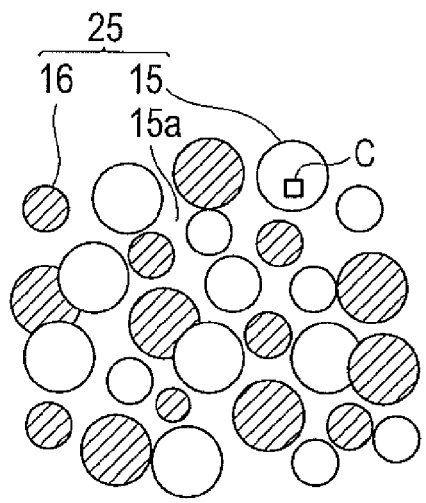
Figure 10C:
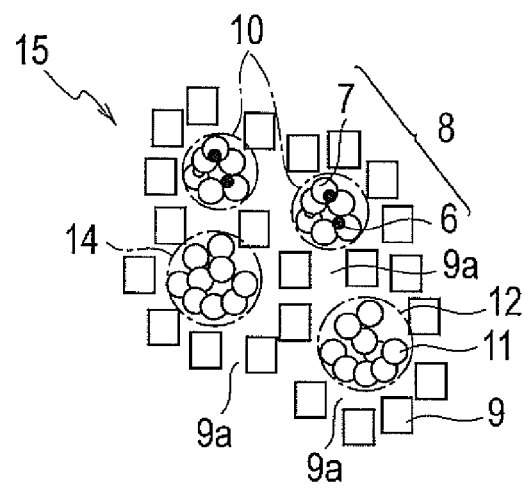

An exhaust gas purifying catalyst 25 according to the present embodiment is contained in a catalyst layer 3A of the exhaust gas purifying catalyst structure 1 as shown in FIG. 10A. As shown in FIG. 10B and FIG. 10C, the catalyst layer 3A includes catalyst powder 25 containing the plural catalyst particles 15 according to the second embodiment and plural second promoter particles 16.

As disclosed in Japanese Patent Unexamined Publication No. 2008-093496, there is known an exhaust gas purifying catalyst containing catalyst powder that contains: a catalytic active species enclosure material in which a metal oxide supporting noble metal particles are covered with a high heat resistant oxide; and a promoter enclosure material in which promoter particles are covered with a high heat resistant oxide. In the catalyst powder, since the promoter particles are covered with the heat resistant oxide, aggregation of the promoter particles and a decrease in specific surface area are suppressed. Accordingly, high durability can be exerted.

When the inside of a honeycomb substrate is coated with the catalyst powder disclosed in Japanese Patent Unexamined Publication No. 2008-093496 to form a catalyst layer, a pore diameter between the particles of the catalyst powder in the catalyst layer is much larger than a pore diameter of the high heat resistant oxide that covers the promoter particles. As a result, exhaust gas flowing into the catalyst layer from the inlet of the honeycomb substrate passes through the fine pores between the particles of the catalyst powder more easily than the fine pores of the high heat resistant oxide. Thus, in the case in which exhaust gas excessively contains oxygen, the oxygen reaches deeply the inside of the catalyst layer before the promoter component enclosed with the high heat resistant oxide completely absorbs oxygen. Therefore, since the oxygen is excessively present around the catalyst powder in the deep portion of the catalyst layer, there is a case in which nitrogen oxide is hardly reduced. In addition, in the case in which an air-fuel ratio (A/F) of exhaust gas varies, the variation of the air-fuel ratio cannot be completely absorbed only by the upper layer portion of the catalyst layer. As a result, purifying efficiency of exhaust gas may decrease.

In view of such a conventional case, in the exhaust gas purifying catalyst (catalyst powder) 25 according to the present embodiment, as shown in FIG. 10B, the second promoter particles 16 are dispersed in the catalyst layer 3A together with the catalyst particles 15. In particular, the second promoter particles 16 are provided in fine pores 15a formed between the plural catalyst particles 15, so that the second promoter particles 16 can sufficiently adsorb oxygen in exhaust gas passing though the fine pores. Therefore, since the oxygen does not easily reach deeply inside the catalyst layer, the oxygen is hardly present excessively at the periphery of the catalyst powder. Accordingly, nitrogen oxide can be reduced sufficiently. In addition, active oxygen adsorbed by the first promoter particles 11 and the second promoter particles 16 is released at the time of a large shift from a lean atmosphere to a stoichiometric or rich atmosphere. Thus, HC and CO can also be oxidized efficiently.

In the exhaust gas purifying catalyst according to the present embodiment, a weight ratio of the first promoter particles to the total weight of the first promoter particles and the second promoter particle is preferably 0.3 or greater, more preferably in the range from 0.4 to 0.8. When the weight ratio is within such a range, oxygen can be effectively adsorbed and released with respect to the noble metal particles on the anchor particles due to the first promoter particles, and excessive oxygen is also adsorbed by the second promoter particles. Accordingly, NOx purification performance can be improved.

The second promoter particles 16 preferably contain at least one of cerium (Ce) and praseodymium (Pr) having an oxygen storage and release capacity as in the case of the first promoter particles 11. In particular, the second promoter particles 16 preferably contain a compound as a main component having a high oxygen storage and release capacity, such as cerium oxide ($CeO_2$) and praseodymium oxide ($Pr_6O_{11}$).

The second promoter particles 16 are preferably an oxide further containing at least one element selected from the group consisting of iron (Fe), manganese (Mn), cobalt (Co) and nickel (Ni) as in the case of the first promoter particles 11. When at least one transition metal is contained in the second promoter particles 16, a catalytic activity, especially a purification rate of CO and NO, can be improved due to active oxygen contained in the transition metal.

An average particle diameter (D50) of each of the catalyst particles 15 and the second promoter particles 16 is preferably 6 μm or smaller. This average particle diameter is an average particle diameter of the catalyst particles 15 and the second promoter particles 16 in the catalyst layer 3A, as shown in FIG. 10B. When the average particle diameter is greater than 6 μm, a distance from the periphery to the center of each of the catalyst particles 15 and the second promoter particles 16 increases, and gas dispersibility toward the center of the respective particles significantly decreases. As a result, a reduction in purification performance may be caused. In addition, when the average particle diameter is greater than 6 μm, exfoliation or unevenness of the coating material coated on the honeycomb substrate tends to be easily caused. The average particle diameter of each of the catalyst particles 15 and the second promoter particles 16 is more preferably in the range from 1 μm to 4 μm, so that proper gaps are formed between the particles and exfoliation can be further prevented. The average particle diameter of each of the catalyst particles 15 and the second promoter particles 16 may be obtained by analysis of slurry containing the respective particles with a laser diffraction particle size distribution analyzer.

The exhaust gas purifying catalyst according to the present embodiment includes the promoter particles having an oxygen storage and release capacity provided in the fine pores provided between the respective catalyst particles 15 according to the second embodiment. Accordingly, excessive oxygen can be adsorbed even if the air-fuel ratio of the exhaust gas varies so that high NOx purification performance can be ensured even in the inside of the catalyst layer.

[Method for Manufacturing Exhaust gas purifying catalyst]

<Method for Manufacturing Exhaust Gas Purifying Catalyst of First Embodiment>

Next, a method for manufacturing the exhaust gas purifying catalyst according to the first embodiment is explained below. The method for manufacturing the catalyst includes a step of pulverizing the composite particles 8 of the noble metal particles 6 and the anchor particles 7, a step of mixing the pulverized composite particles 8 into slurry containing a precursor of the enclosure materials 9 and a precursor of at least one of the alkali element and the alkaline-earth element and drying the slurry.

In particular, the anchor particles 7 containing at least one of the alkali element and the alkaline-earth element are first prepared. The anchor particles 7 may be prepared in a manner such that powder as a main component of the anchor particles such as $Al_2O_3$, $CeO_2$, $ZrO_2$, $Y_2O_3$ or $Nd_2O_3$ as described above is mixed into an aqueous solution of alkali elements, and the mixed material is then stirred and dried. The aqueous solution of the alkali elements may be obtained in a manner such that nitrate or acetate of the alkali elements is dissolved in deionized water. Examples of nitrate or acetate of the alkali elements include sodium acetate ($CH_3CO_2Na$), sodium nitrate ($NaNO_3$), potassium acetate ($CH_3CO_2K$), potassium nitrate ($KNO_3$), rubidium acetate ($CH_3CO_2Rb$), rubidium nitrate ($RbNO_3$), cesium acetate ($CH_3CO_2Cs$), cesium nitrate ($CsNO_3$), magnesium acetate ($Mg(CH_3CO_2)_2$), magnesium nitrate ($Mg(NO_3)_2$), calcium acetate ($Ca(CH_3CO_2)_2$), calcium nitrate ($Ca(NO_3)_2$), strontium acetate ($Sr(CH_3CO_2)_2$), strontium nitrate ($Sr(NO_3)_2$), barium acetate ($Ba(CH_3CO_2)_2$), and barium nitrate ($Ba(NO_3)_2$). Note that the anchor particles containing the alkali elements may be conventionally-known particles prepared by a co-precipitation process.

Next, the noble metal particles 6 are supported on the anchor particles 7. The noble metal particles 6 may be supported on the anchor particles 7 by an impregnation process. Then, the anchor particles 7 supporting the noble metal particles 6 on the surfaces thereof are pulverized with a bead mill or the like so as to obtain a desired particle diameter. For example, the particle diameter of the anchor particles 7 may be 300 nm as described above. Here, when a fine raw material such as an oxide colloid is used for the anchor particles 7, the pulverizing step may be omitted.

Next, enclosure slurry containing a precursor of the enclosure materials 9 and a precursor of at least one of the alkali element and the alkaline-earth element is prepared. The precursor of the enclosure materials 9 used is preferably boehmite (AlOOH) when the enclosure materials contain alumina as a main component, and is preferably silica sol and zeolite when the enclosure materials contain silica as a main component, as described above. The enclosure slurry may be prepared in a manner such that the precursor of the enclosure materials 9 is mixed into a solvent such as water, and the precursor of at least one of the alkali element and the alkaline-earth element is mixed thereto and stirred. The precursor of at least one of the alkali element and the alkaline-earth element may be acetate or nitrate of these elements, as described above.

Subsequently, the pulverized anchor particles 7 supporting the noble metal particles 6 thereon are added to the enclosure slurry and the mixture is then stirred. The precursor of the enclosure materials 9 containing the alkali elements adheres to peripheries of the anchor particles 7 when the slurry is stirred. Thereafter, the slurry is dried and baked, thereby obtaining the catalyst particles (the exhaust gas purifying catalyst) 5 in which the enclosure materials 9 containing the alkali elements are formed on the peripheries of the anchor particles 7 supporting the noble metal thereon.

Method for Manufacturing Exhaust Gas Purifying Catalyst of Second Embodiment

Next, a method for manufacturing the exhaust gas purifying catalyst according to the second embodiment is explained below. In the method for manufacturing the catalyst of the present embodiment, the anchor particles 7 containing at least one of the alkali element and the alkaline-earth element are first prepared as in the case of the method for manufacturing the catalyst according to the first embodiment. Next, the noble metal particles 6 are supported on the anchor particles 7. The noble metal may be supported on the anchor particles 7 by an impregnation process as in the case described above. Then, the anchor particles 7 supporting the noble metal particles 6 on the surfaces thereof are pulverized in the same manner as described above so as to obtain a desired particle diameter. Similarly, the first promoter particles 11 are also pulverized with a bead mill or the like so as to obtain a desired particle diameter. In this case, the anchor particles 7 and the first promoter particles 11 may be pulverized in a mixed state or pulverized individually. As in the case described above, when a fine raw material such as an oxide colloid is used for the first promoter particles 11, the pulverizing step may be omitted.

With regard to the enclosure of the composite particles 8 and the first promoter particles 11 with the enclosure materials 9 after the pulverization, the composite particles 8 preliminarily enclosed are not mixed with the first promoter particles 11 preliminarily enclosed, but the composite particles 8 and the first promoter particles 11 are preferably concurrently enclosed with the enclosure materials 9. Accordingly, the composite particles 8 and the first promoter particles 11 can be dispersed uniformly without unevenness.

In particular, the composite particles 8 and the first promoter particles 11 are added to enclosure slurry in which the alkali elements and a precursor of the enclosure materials 9 are dispersed, and the mixture is then stirred. The precursor of the enclosure materials 9 containing the alkali elements adheres to peripheries of the composite particles 8 and the first promoter particles 11 when the slurry is stirred. In this case, the slurry is intensively stirred in a manner such that the respective particles are sufficiently dispersed in the slurry, so that the degree of dispersion can be improved. Subsequently, the mixed slurry is dried and baked, thereby obtaining the catalyst particles (the exhaust gas purifying catalyst) 15 in which the enclosure materials 9 containing the alkali elements are formed on the peripheries of the composite particles 8 and the first promoter particles 11.

Method for Manufacturing Exhaust Gas Purifying Catalyst of Third Embodiment

Next, a method for manufacturing the exhaust gas purifying catalyst according to the third embodiment is explained. In the method for manufacturing the catalyst of the present embodiment, the catalyst particles 15 are first prepared in which the enclosure materials 9 containing the alkali elements are formed on the peripheries of the composite particles 8 and the first promoter particles 11 as in the case of the method for manufacturing the catalyst according to the second embodiment. Subsequently, the catalyst particles 15 and the second promoter particles 16 are mixed, so as to obtain the catalyst powder 25 (the exhaust gas purifying catalyst 25).

[Method for Manufacturing Exhaust Gas Purifying Catalyst Structure]

Next, a method for manufacturing the exhaust gas purifying catalyst structure according to the present invention is explained below. In this manufacturing method, the exhaust gas purifying catalysts 5, 15 and 25 prepared as described above are first pulverized. This pulverization may be either wet pulverization or dry pulverization. In general, the exhaust gas purifying catalysts 5, 15 and 25 are mixed into a solvent such as deionized water, and the mixture thus obtained is stirred and then pulverized with a ball mill or the like, so as to obtain catalyst slurry in which the exhaust gas purifying catalysts 5, 15 and 25 are dispersed in the solvent. In this case, a binder is added to the catalyst slurry as necessary. An average particle diameter (D50) of the exhaust gas purifying catalysts 5, 15 and 25 in the catalyst slurry is preferably 6 μm or smaller.

Subsequently, the catalyst slurry is applied to the inner surface of the fire-resistant inorganic substrate (the honeycomb substrate), and the substrate is then dried and baked, so that the exhaust gas purifying catalyst structure can be obtained.

[Exhaust Gas Purifying System]

Figure 11:
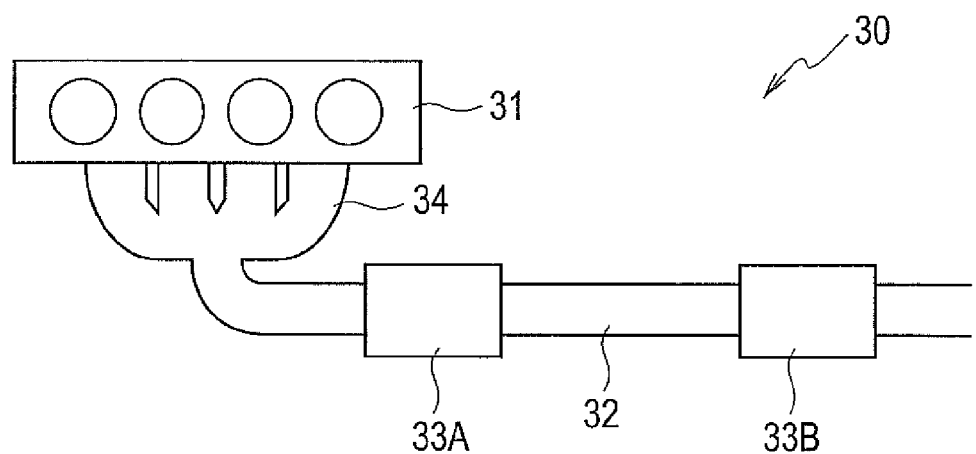
FIG. 11 is a schematic view showing an exhaust gas purifying system according to an embodiment of the present invention.

As shown in FIG. 11, an exhaust gas purifying system 30 according to the present embodiment may have a configuration in which exhaust gas purifying catalyst structures 33A and 33B are installed in an exhaust gas flow path 32 of an internal combustion engine 31. At least one of the exhaust gas purifying catalyst structures 33A and 33B preferably employs the exhaust gas purifying catalyst structure including the exhaust gas purifying catalysts 5, 15 and 25.

The exhaust gas purifying system 30 according to the present embodiment with the above-described configuration can promptly activate the exhaust gas purifying catalyst structures 33A and 33B and thereby purify exhaust gas even in a low temperature region. In particular, since the exhaust gas purifying catalyst structure according to the present invention can prevent aggregation of the noble metal particles even under remarkably high temperature conditions, the exhaust gas purifying catalyst structure can be installed immediately under an exhaust manifold 34. Further, since the catalyst structure can be activated promptly when installed immediately under the exhaust manifold 34, the catalyst structure can efficiently start purifying exhaust gas from low temperature. Note that the exhaust gas purifying system according to the present embodiment is not limited to the configuration shown in FIG. 11. For example, an additional three-way catalyst or NOx adsorbing catalyst may be installed in front of or behind the exhaust gas purifying catalyst structures 33A and 33B. In addition, the exhaust gas purifying system 30 according to the present embodiment may be applied to various internal combustion engines such as a gasoline engine, a lean-burn engine, a direct-injection engine and a diesel engine.

EXAMPLES

Hereinafter, the present invention will be described in more detail in accordance with examples and comparative examples. However, the present invention is not limited to the examples.

Example 1

Preparation of Pd Powder

First, activated zirconia-ceria-calcia composite oxide powder ($ZrO_2$—$CeO_2$—$CaO$) having a specific surface area of approximately 70 m$^2$/g was impregnated with a palladium nitrate solution. This mixture was dried at 150° C. for 24 hours and baked at 400° C. for one hour, so as to obtain Pd-supporting $ZrO_2$—$CeO_2$—$CaO$ powder. Next, the Pd-supporting $ZrO_2$—$CeO_2$—$CaO$ powder was pulverized in a manner as to obtain an average particle diameter (D50) of 150 nm. Here, the average particle diameter of each of this example and comparative examples was measured with a laser diffraction/scattering particle size distribution analyzer LA-920 manufactured by Horiba, Ltd.

Subsequently, boehmite (an enclosure precursor), calcium nitrate ($Ca(NO_3)_2$), 10% of nitric acid and water were mixed and stirred for one hour to prepare a Ca-containing boehmite aqueous solution. The mixed amount of calcium nitrate was adjusted in a manner as to have a molar ratio of the alkali metals to palladium (alkali metals/palladium) as shown in Table 1.

Subsequently, the pulverized Pd-supporting $ZrO_2$—$CeO_2$—$CaO$ powder was slowly added into the Ca-containing boehmite aqueous solution and then stirred for another two hours by use of a high-speed stirring machine. The slurry thus obtained was rapidly dried, and further dried at 150° C. for 24 hours to remove moisture therefrom. The product thus obtained was baked at 550° C. for three hours in air, thereby obtaining Pd powder of Example 1. Here, this Pd powder is obtained in a manner such that the Pd-supporting $ZrO_2$—$CeO_2$—CaO powder is enclosed with the enclosure materials containing alumina and calcia as shown in FIG. 1(c).

(Preparation of Rh Powder) First, zirconia powder ($ZrO_2$) having a specific surface area of approximately 70 m$^2$/g was impregnated with a rhodium nitrate solution. This mixture was dried at 150° C. for 24 hours and baked at 400° C. for one hour, so as to obtain Rh-supporting $ZrO_2$ powder. Next, the Rh-supporting $ZrO_2$ powder was pulverized in a manner as to obtain an average particle diameter (D50) of 150 nm.

Subsequently, boehmite, nitric acid and water were mixed and stirred for one hour. The pulverized Rh-supporting $ZrO_2$ powder was slowly added into this solution and further stirred for another two hours by use of a high-speed stirring machine. The slurry thus obtained was rapidly dried and further dried at 150° C. for 24 hours to remove moisture therefrom. The product thus obtained was baked at 550° C. for three hours in air, thereby obtaining Rh powder of Example 1. Here, this Rh powder is obtained in a manner such that the Rh-supporting $ZrO_2$ powder is enclosed with the enclosure materials containing alumina.

(Preparation of Catalyst layer) First, 175 g of the Pd powder, 25 g of $CeO_2$—$ZrO_2$ powder, 25 g of alumina sol, 230 g of water and 10 g of nitric acid were added into a magnetic ball mill, mixed and pulverized so as to obtain Pd catalyst slurry. Here, the mass ratio of $CeO_2$ to $ZrO_2$ in the $CeO_2$—$ZrO_2$ powder is 20 to 80.

Next, 200 g of the Rh powder, 25 g of alumina sol, 230 g of water and 10 g of nitric acid were added into a magnetic ball mill, mixed and pulverized so as to obtain Rh catalyst slurry.

Next, the Rh catalyst slurry was applied onto a cordierite monolithic substrate (0.12 L; 900 cells), and redundant slurry inside the cells was removed by airflow. Subsequently, the substrate to which the slurry was applied was dried at 130° C. and then baked at 400° C. for one hour, thereby forming a Rh catalyst layer. Further, the Pd catalyst slurry was applied onto the monolithic substrate on which the Rh catalyst layer was supported, and redundant slurry inside the cells was removed by airflow. Subsequently, the substrate to which the slurry was applied was dried at 130° C. and then baked at 400° C. for one hour, thereby forming a Pd catalyst layer. Accordingly, a catalyst structure of Example 1 in which the Pd catalyst layer was formed as an upper layer and the Rh catalyst layer was formed as an inner layer, was manufactured.

Examples 2 and 4 to 8

Catalyst structures of Examples 2 and 4 to 8 were each obtained in the same manner as Example 1 except that the type of the anchor materials and the type of the alkali metals added to the enclosure materials were changed to the compounds shown in Table 1, and the amount of each of the anchor materials, the alkali metals, the enclosure materials and Pd was adjusted to the value shown in Table 1.

Example 3

(Preparation of Pd Powder) First, activated zirconia-ceria-calcia composite oxide powder ($ZrO_2$—$CeO_2$—CaO) having a specific surface area of approximately 65 m$^2$/g was impregnated with a palladium nitrate solution. This mixture was dried at 150° C. for 24 hours and baked at 400° C. for one hour, so as to obtain Pd-supporting $ZrO_2$—$CeO_2$—CaO powder. Next, the Pd-supporting $ZrO_2$—$CeO_2$—CaO powder was pulverized in a manner as to obtain an average particle diameter (D50) of 150 nm.

In addition, activated ceria powder having a specific surface area of approximately 50 m$^2$/g was pulverized in the same manner as described above so as to obtain an average particle diameter (D50) of 200 nm.

Subsequently, boehmite, strontium nitrate ($Sr(NO_3)_2$), 10% of nitric acid and water were mixed and stirred for one hour to prepare a Sr-containing boehmite aqueous solution. The mixed amount of strontium nitrate was adjusted in a manner as to have a molar ratio of the alkali metals to palladium (alkali metals/palladium) as shown in Table 1.

Subsequently, both the pulverized Pd-supporting $ZrO_2$—$CeO_2$—CaO powder and the activated ceria powder were slowly added into the Sr-containing boehmite aqueous solution and then stirred for another two hours by use of a high-speed stirring machine. The slurry thus obtained was rapidly dried and further dried at 150° C. for 24 hours to remove moisture therefrom. The product thus obtained was baked at 550° C. for three hours in air, thereby obtaining Pd powder of Example 3. Here, this Pd powder is obtained in a manner such that both the Pd-supporting $ZrO_2$—$CeO_2$—CaO powder and the activated ceria powder are simultaneously enclosed with the enclosure materials containing alumina and strontium oxide as shown in FIG. 6.

(Preparation of Catalyst layer) First, 175 g of the Pd powder, 25 g of the $CeO_2$—$ZrO_2$ powder used in Example 1, 25 g of alumina sol, 230 g of water and 10 g of nitric acid were added into a magnetic ball mill, mixed and pulverized so as to obtain Pd catalyst slurry.

Next, the Rh catalyst slurry of Example 1 was applied onto a cordierite monolithic substrate (0.12 L; 900 cells), and redundant slurry inside the cells was removed by airflow. Subsequently, the substrate to which the slurry was applied was dried at 130° C. and then baked at 400° C. for one hour, thereby forming a Rh catalyst layer. Further, the Pd catalyst slurry was applied onto the monolithic substrate on which the Rh catalyst layer was supported, and redundant slurry inside the cells was removed by airflow. Subsequently, the substrate to which the slurry was applied was dried at 130° C. and then baked at 400° C. for one hour, thereby forming a Pd catalyst layer. Accordingly, a catalyst structure of Example 3 in which the Pd catalyst layer was formed as an upper layer and the Rh catalyst layer was formed as an inner layer, was manufactured. Here, the Pd catalyst layer contains the catalyst particles in which both the Pd-supporting $ZrO_2$—$CeO_2$—CaO powder and the activated ceria powder are simultaneously enclosed with the enclosure materials containing alumina and strontium oxide, and the $CeO_2$—$ZrO_2$ powder as the second promoter particles, as shown in FIG. 10.

Comparative Example 1

(Preparation of Pd Powder) First, activated zirconia-ceria-calcia composite oxide powder ($ZrO_2$—$CeO_2$—CaO) having a specific surface area of approximately 70 m$^2$/g was impregnated with a palladium nitrate solution. This mixture was dried at 150° C. for 24 hours and baked at 400° C. for one hour, so as to obtain Pd-supporting $ZrO_2$—$CeO_2$—CaO powder. Next, the Pd-supporting $ZrO_2$—$CeO_2$—CaO powder was pulverized in a manner as to obtain an average particle diameter (D50) of 150 nm.

Next, boehmite (an enclosure precursor), 10% of nitric acid and water were mixed and stirred for one hour to prepare a boehmite aqueous solution. Subsequently, the pulverized Pd-supporting $ZrO_2$—$CeO_2$—CaO powder was slowly added into the boehmite aqueous solution and then stirred for another two hours by use of a high-speed stirring machine. The slurry thus obtained was rapidly dried and further dried at 150° C. for 24 hours to remove moisture therefrom. The product thus obtained was baked at 550° C. for three hours in air, thereby obtaining Pd powder of Comparative Example 1. Here, this Pd powder is obtained in a manner such that the Pd-supporting $ZrO_2$—$CeO_2$—CaO powder is enclosed with the enclosure materials containing alumina.

(Preparation of Catalyst layer) First, 175 g of the Pd powder, 25 g of the $CeO_2$—$ZrO_2$ powder used in Example 1, 25 g of alumina sol, 230 g of water and 10 g of nitric acid were added into a magnetic ball mill, mixed and pulverized so as to obtain Pd catalyst slurry.

Next, the Rh catalyst slurry of Example 1 was applied onto a cordierite monolithic substrate (0.12 L; 900 cells), and redundant slurry inside the cells was removed by airflow. Subsequently, the substrate to which the slurry was applied was dried at 130° C. and then baked at 400° C. for one hour, thereby forming a Rh catalyst layer. Further, the Pd catalyst slurry was applied onto the monolithic substrate on which the Rh catalyst layer was supported, and redundant slurry inside the cells was removed by airflow. Subsequently, the substrate to which the slurry was applied was dried at 130° C. and then baked at 400° C. for one hour, thereby forming a Pd catalyst layer. Accordingly, a catalyst structure of Comparative Example 1 in which the Pd catalyst layer was formed as an upper layer and the Rh catalyst layer was formed as an inner layer, was manufactured.

Comparative Example 2

(Preparation of Pd Powder) First, activated zirconia-ceria composite oxide powder ($ZrO_2$—$CeO_2$) having a specific surface area of approximately 70 $m^2/g$ was impregnated with a palladium nitrate solution. This mixture was dried at 150° C. for 24 hours and baked at 400° C. for one hour, so as to obtain Pd-supporting $ZrO_2$—$CeO_2$ powder. Next, the Pd-supporting $ZrO_2$—$CeO_2$ powder was pulverized in a manner as to obtain an average particle diameter (D50) of 150 nm.

Subsequently, boehmite (an enclosure precursor), calcium nitrate ($Ca(NO_3)_2$), 10% of nitric acid and water were mixed and stirred for one hour to prepare a Ca-containing boehmite aqueous solution. The mixed amount of calcium nitrate was adjusted in a manner as to have a molar ratio of the alkali metals to palladium (alkali metals/palladium) as shown in Table 1.

Subsequently, the pulverized Pd-supporting $ZrO_2$—$CeO_2$ powder was slowly added into the Ca-containing boehmite aqueous solution and then stirred for another two hours by use of a high-speed stirring machine. The slurry thus obtained was rapidly dried and further dried at 150° C. for 24 hours to remove moisture therefrom. The product thus obtained was baked at 550° C. for three hours in air, thereby obtaining Pd powder of Comparative Example 2. Here, this Pd powder is obtained in a manner such that the Pd-supporting $ZrO_2$—$CeO_2$ powder is enclosed with the enclosure materials containing alumina and calcia.

(Preparation of Rh Powder) First, activated alumina powder having a specific surface area of approximately 150 $m^2/g$ was impregnated with a rhodium nitrate aqueous solution. This mixture was dried at 150° C. for 12 hours and baked at 400° C. for one hour, so as to obtain Rh powder.

(Preparation of Catalyst layer) First, 175 g of the Pd powder, 25 g of the $CeO_2$—$ZrO_2$ powder used in Example 1, 25 g of alumina sol, 230 g of water and 10 g of nitric acid were added into a magnetic ball mill, mixed and pulverized so as to obtain Pd catalyst slurry.

Next, 200 g of the Rh powder, 25 g of alumina sol, 230 g of water and 10 g of nitric acid were added into a magnetic ball mill, mixed and pulverized so as to obtain Rh catalyst slurry.

Next, the Rh catalyst slurry was applied onto a cordierite monolithic substrate (0.12 L; 900 cells), and redundant slurry inside the cells was removed by airflow. Subsequently, the substrate to which the slurry was applied was dried at 130° C. and then baked at 400° C. for one hour, thereby forming a Rh catalyst layer. Further, the Pd catalyst slurry was applied onto the monolithic substrate on which the Rh catalyst layer was supported, and redundant slurry inside the cells was removed by airflow. Subsequently, the substrate to which the slurry was applied was dried at 130° C. and then baked at 400° C. for one hour, thereby forming a Pd catalyst layer. Accordingly, a catalyst structure of Comparative Example 2 in which the Pd catalyst layer was formed as an upper layer and the Rh catalyst layer was formed as an inner layer, was manufactured.

Comparative Example 3

(Preparation of Pd Powder) First, activated alumina powder having a specific surface area of approximately 150 $m^2/g$ was impregnated with a palladium nitrate aqueous solution. This mixture was dried at 150° C. for 12 hours and baked at 400° C. for one hour, so as to obtain Pd powder.

(Preparation of Catalyst layer) First, 175 g of the Pd powder, 25 g of the $CeO_2$—$ZrO_2$ powder used in Example 1, 25 g of alumina sol, 230 g of water and 10 g of nitric acid were added into a magnetic ball mill, mixed and pulverized so as to obtain Pd catalyst slurry.

Next, the Rh catalyst slurry of Comparative Example 2 was applied onto a cordierite monolithic substrate (0.12 L; 900 cells), and redundant slurry inside the cells was removed by airflow. Subsequently, the substrate to which the slurry was applied was dried at 130° C. and then baked at 400° C. for one hour, thereby forming a Rh catalyst layer. Further, the Pd catalyst slurry was applied onto the monolithic substrate on which the Rh catalyst layer was supported, and redundant slurry inside the cells was removed by airflow. Subsequently, the substrate to which the slurry was applied was dried at 130° C. and then baked at 400° C. for one hour, thereby forming a Pd catalyst layer. Accordingly, a catalyst structure of Comparative Example 3 in which the Pd catalyst layer was formed as an upper layer and the Rh catalyst layer was formed as an inner layer, was manufactured.

[Method of Durability Test]

The catalyst obtained in each of Examples 1 to 8 and Comparative Examples 1 to 3 was installed in an exhaust system of a 3500-cc gasoline engine and then driven for 50 hours in a manner such that the exhaust gas temperature at the catalyst inlet was set to 920° C. so that the catalyst deteriorated. Here, when the exhaust gas temperature at the catalyst inlet is set to 920° C., the temperature inside the catalyst is approximately 960° C. Subsequently, the deteriorated catalyst of each example was installed in an exhaust system of a 3500-cc gasoline engine, and the catalyst inlet temperature was set to 480° C. Accordingly, a conversion rate of hydrocarbon (a HC conversion rate) was obtained based on hydrocarbon concentrations at the inlet and outlet of the catalyst of each example according to the following formula 2.

$$HC \text{ conversion rate}(\%) = \frac{(HC \text{ concentration at catalyst inlet}) - (HC \text{ concentration at catalyst outlet})}{(HC \text{ concentration at catalyst inlet})} \times 100$$

Table 1 shows the type of the noble metal, the type of the noble metal-supporting substrate, the molar ratio of the alkali metals to palladium, the particle diameter of the catalyst powder, the amount of the noble metal in the catalyst, and the HC conversion rate after the durability test of each of Examples 1 to 8 and Comparative Examples 1 to 3. Table 1 further shows the mass ratio of each oxide in the noble metal-supporting substrate in parentheses.

1. In comparison between Example 7 and Comparative Example 1, the HC conversion rate of Example 7 increased by 4% even through the Pd amount was smaller in Example 7. Further, the HC conversion rate increased when not only Ca but also Mg, Sr, Ba, K and Na were contained in the enclosure materials as the alkali elements.

Figure 12:
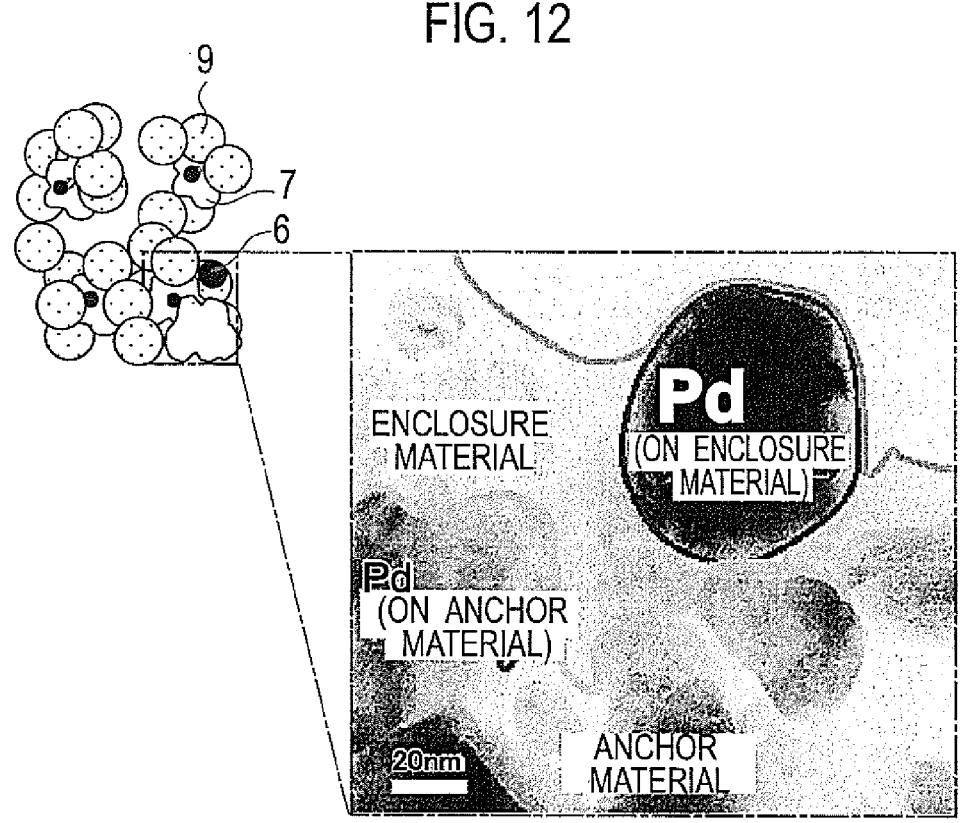
FIG. 12 is a transmission electron micrograph of an exhaust gas purifying catalyst of Example 1.

The particle diameters of the Pd particles of each of Example 1 and Comparative Example 1 were further measured with TEM. FIG. 12 shows a transmission electron micrograph of the Pd catalyst layer of Example 1 after the durability test. In Example 1, as shown in FIG. 12, the Pd particle diameter on the enclosure materials after the durability test was 80 nm, and the Pd particle diameter on the anchor particles was 9 nm. In Comparative Example 1, the Pd particle

TABLE 1

| | Noble Metal | | Noble Metal-Supporting Substrate | | Molar Ratio of Alkali Metals in Enclosure Materials to Pd (-) | Catalyst Powder Particle Diameter (μm) | Noble Metal Amount in Catalyst (Pd/Rh) (g/L) | HC Conversion Rate after Durability Test (%) |
|---|---|---|---|---|---|---|---|---|
| | Upper Layer | Inner Layer | Upper Layer (wt % in parentheses) | Inner Layer | | | | |
| Example 1 | Pd | Rh | Anchor Particles: $ZrO_2$ (37.5)—$CeO_2$ (10)—CaO (2.5) Enclosure Materials: CaO (5)—$Al_2O_3$ (45) | Anchor Particles: $ZrO_2$ Enclosure Materials: $Al_2O_3$ | 1.0 | 3.5 | 3.0/0.4 | 95.0 |
| Example 2 | Pd | Rh | Anchor Particles: $ZrO_2$ (40)—$CeO_2$ (7.5)—MgO (2.5) Enclosure Materials: MgO (2.5)—$Al_2O_3$ (47.5) | Anchor Particles: $ZrO_2$ Enclosure Materials: $Al_2O_3$ | 0.5 | 4.5 | 2.8/0.4 | 92.0 |
| Example 3 | Pd | Rh | Anchor Particles: $ZrO_2$ (35)—$CeO_2$ (10)—CaO (5) Enclosure Materials: SrO (7.5)—$Al_2O_3$ (42.5) | Anchor Particles: $ZrO_2$ Enclosure Materials: $Al_2O_3$ | 1.5 | 3.0 | 3.2/0.4 | 93.0 |
| Example 4 | Pd | Rh | Anchor Particles: $ZrO_2$ (35)—$CeO_2$ (10)—MgO (5) Enclosure Materials: BaO (6)—$Al_2O_3$ (44) | Anchor Particles: $ZrO_2$ Enclosure Materials: $Al_2O_3$ | 1.2 | 2.5 | 3.5/0.4 | 92.0 |
| Example 5 | Pd | Rh | Anchor Particles: $ZrO_2$ (35)—$CeO_2$ (10)—CaO (5) Enclosure Materials: $K_2O$ (10)—$Al_2O_3$ (40) | Anchor Particles: $ZrO_2$ Enclosure Materials: $Al_2O_3$ | 2.0 | 3.0 | 3.0/0.4 | 94.0 |
| Example 6 | Pd | Rh | Anchor Particles: $ZrO_2$ (42.5)—$CeO_2$ (5)—CaO (2.5) Enclosure Materials: NaO (4)—$Al_2O_3$ (46) | Anchor Particles: $ZrO_2$ Enclosure Materials: $Al_2O_3$ | 0.8 | 2.5 | 3.0/0.4 | 92.0 |
| Example 7 | Pd | Rh | Anchor Particles: $ZrO_2$ (35)—$CeO_2$ (10)—CaO (5) Enclosure Materials: CaO (5)—$Al_2O_3$ (45) | Anchor Particles: $ZrO_2$ Enclosure Materials: $Al_2O_3$ | 0.9 | 3.5 | 2.5/0.4 | 94.0 |
| Example 8 | Pd | Rh | Anchor Particles: $ZrO_2$ (40)—$CeO_2$ (5)—MgO (5) Enclosure Materials: MgO (5)—$Al_2O_3$ (45) | Anchor Particles: $ZrO_2$ Enclosure Materials: $Al_2O_3$ | 1.8 | 2.5 | 2.5/0.4 | 92.0 |
| Comparative Example 1 | Pd | Rh | Anchor Particles: $ZrO_2$ (25)—$CeO_2$ (20)—CaO (5) Enclosure Materials: $Al_2O_3$ (50) | Anchor Particles: $ZrO_2$ Enclosure Materials: $Al_2O_3$ | 0 | 5.5 | 2.8/0.4 | 90.0 |
| Comparative Example 2 | Pd | Rh | Anchor Particles: $ZrO_2$ (40)—$CeO_2$ (10) Enclosure Materials: CaO (5)—$Al_2O_3$ (45) | $Al_2O_3$ | 0.2 | 4.0 | 3.0/0.4 | 85.0 |
| Comparative Example 3 | Pd | Rh | $Al_2O_3$ | $Al_2O_3$ | 0 | 6.5 | 2.5/0.4 | 60.0 |

The tests for the examples and the comparative examples revealed that the HC conversion rate was improved when both the anchor particles and the enclosure materials contained at least one of the alkali element and the alkaline-earth element. In particular, in comparison between Example 1 and Comparative Example 1, the HC conversion rate of Example 1 increased by 5% by adding calcium to the enclosure materials in Example 1, although it is true that the Pd amount in Comparative Example 1 was slightly smaller than that in Example diameter on the enclosure materials after the durability test was 150 nm, and the Pd particle diameter on the anchor particles was 8 nm. Namely, in Comparative Example 1, the Pd particles were aggregated and grown on the enclosure materials even through the Pd amount was slightly smaller than Example 1. Accordingly, it is apparent that movement and aggregation of Pd can be prevented when not only the anchor particles but also the enclosure materials contain the alkali element.

Although the present invention has been described above in accordance with the examples and the comparative examples, the present invention is not limited to these examples, and it will be apparent to those skilled in the art that various modifications and improvements can be made within the scope of the present invention. For example, in Examples, although the catalyst layer has a two-layer structure of the Pt catalyst layer and the Rh catalyst layer, the catalyst layer may have a single-layer structure or three or more-layer structure. Further, the present invention can ensure high purification performance even when the undercoat layer 4 shown in FIG. 1B is not formed.

Although the present invention has been described above by reference to the examples, the present invention is not limited to the descriptions thereof, and it will be apparent to those skilled in the art that various modifications and improvements can be made.

The exhaust gas purifying catalyst according to the present invention contains the alkali element and the alkaline-earth element not only in the anchor particles but also in the enclosure materials. Since the movement and aggregation of the noble metal particles on the surfaces of the anchor particles and the enclosure materials can be prevented, the noble metal particles can be kept in a fine state so as to keep high purification performance immediately after the manufacture even if the catalyst temperature reaches high temperature exceeding 900° C. In addition, the method for manufacturing an exhaust gas purifying catalyst according to the present invention can easily manufacture such an exhaust gas purifying catalyst.

The invention claimed is:

1. An exhaust gas purifying catalyst, comprising:
   plural catalyst units containing: noble metal particles; and anchor particles serving as an anchor material of the noble metal particles and supporting the noble metal particles thereon; and
   an enclosure material enclosing the plural catalyst units and separating the catalyst units from one another,
   wherein the anchor particles and the enclosure material both contain at least one of an alkali element and an alkaline-earth element, and
   wherein a total content of the alkali element and the alkaline-earth element in the enclosure material with respect to a content of the noble metal particles is in a range from 0.5 to 2.0 in terms of a molar ratio.

2. The exhaust gas purifying catalyst according to claim 1, wherein each of the alkali element and the alkaline-earth element contained in the anchor particles and the enclosure material is at least one element selected from the group consisting of sodium, potassium, rubidium, cesium, magnesium, calcium, strontium, and barium.

3. The exhaust gas purifying catalyst according to claim 1, wherein each of the alkali element and the alkaline-earth element contained in the anchor particles and the enclosure material is at least one element selected from the group consisting of magnesium, calcium, strontium, and barium.

4. The exhaust gas purifying catalyst according to claim 1, wherein the noble metal particles contain palladium.

5. The exhaust gas purifying catalyst according to claim 1, wherein the noble metal particles contain palladium,
   each of the alkali element and the alkaline-earth element is at least one element selected from the group consisting of sodium, potassium, magnesium, calcium, strontium, and barium, and
   each of the anchor particles contains greater than or equal to 50% by mole of zirconium oxide, and the enclosure material contains greater than or equal to 50% by mole of aluminum oxide.

6. An exhaust gas purifying catalyst, comprising:
   catalyst particles containing:
      catalyst units containing: noble metal particles; and anchor particles serving as an anchor material of the noble metal particles and supporting the noble metal particles thereon;
      promoter units containing first promoter particles not in contact with the noble metal particles and having an oxygen storage and release capacity; and
      an enclosure material enclosing both the catalyst units and the promoter units and separating the noble metal particles and the anchor particles in the catalyst units from the first promoter particles in the promoter units,
   wherein the anchor particles and the enclosure material both contain at least one of an alkali element and an alkaline-earth element, and
   wherein a total content of the alkali element and the alkaline-earth element in the enclosure material with respect to a content of the noble metal particles is in a range from 0.5 to 2.0 in terms of a molar ratio.

7. The exhaust gas purifying catalyst according to claim 6, further comprising second promoter particles not enclosed in the catalyst particles with the enclosure material and having an oxygen storage and release capacity.

8. The exhaust gas purifying catalyst according to claim 6, wherein the noble metal particles contain palladium,
   each of the alkali element and the alkaline-earth element is at least one element selected from the group consisting of sodium, potassium, magnesium, calcium, strontium, and barium, and
   each of the anchor particles contains greater than or equal to 50% by mole of zirconium oxide, and the enclosure material contains greater than or equal to 50% by mole of aluminum oxide.

9. An exhaust gas purifying catalyst structure, comprising:
   a catalyst layer containing the exhaust gas purifying catalyst according to claim 1; and
   a fire-resistant inorganic substrate supporting the catalyst layer therein.

10. The exhaust gas purifying catalyst structure according to claim 9, further comprising an undercoat layer formed as a lower layer of the catalyst layer and containing a heat-resistant inorganic oxide.

11. An exhaust gas purifying system, comprising:
    an internal combustion engine; and
    the exhaust gas purifying catalyst structure according to claim 9 installed in an exhaust system of the internal combustion engine.

* * * * *